United States Patent [19]
Schimmel et al.

[11] Patent Number: 6,112,286
[45] Date of Patent: Aug. 29, 2000

[54] REVERSE MAPPING PAGE FRAME DATA STRUCTURES TO PAGE TABLE ENTRIES

[75] Inventors: Curt F. Schimmel, San Ramon; Narayanan Ganapathy; Bhanuprakash Subramanya, both of San Jose; Luis Stevens, Milipitas, all of Calif.

[73] Assignee: Silicon Graphics, Inc., Mountain View, Calif.

[21] Appl. No.: 08/933,998

[22] Filed: Sep. 19, 1997

[51] Int. Cl.[7] ........................................ G06F 12/08
[52] U.S. Cl. ............................. 711/208; 711/203
[58] Field of Search ............................ 711/147, 203, 711/206, 207, 208, 209; 364/254.3

[56] References Cited

U.S. PATENT DOCUMENTS

| | | | |
|---|---|---|---|
| 4,577,274 | 3/1986 | Ho et al. | 364/200 |
| 5,101,485 | 3/1992 | Perazzoli, Jr. | 395/400 |
| 5,873,127 | 2/1999 | Harvey et al. | 711/206 |

OTHER PUBLICATIONS

Hennessy and Patterson, *Computer Architecture: A Quantitative Approach*, 2nd Ed., pp. ix–xii, 439–457 and 634–760, Morgan and Kaufman Publishing, USA 1996.

Goodheart, B. and James Cox, *The Magic Garden Explained*, Prentice Hall, 1994, pp. ix–xix and 69–140.

Schimmel, *UNIX System for Modern Architectures: Symmetric Multiprocessing and Caching for Kernel Programmers*, Addison–Wesley Professional Computing Series, 1994, pp. vii–xiv, 5–12 and 59–81.

*Primary Examiner*—Eddie P. Chan
*Assistant Examiner*—Kevin Verbrugge
*Attorney, Agent, or Firm*—Sterne, Kessler, Goldstein & Fox, PLLC

[57] ABSTRACT

A system, method and computer program product for reverse mapping a page of memory to one or more data structure references, such as page table entries, that reference the page of memory. A number m of fields of a page frame data structure are reserved for storing reverse mapping data for a page of memory. Each reserved field can store a reverse map entry for pointing to a data structure reference, such as a page table entry, that references the page of memory that is represented by the page frame data structure. Where a number n of references to the page of memory is greater than the number m of reserved fields, a reverse map table is generated for storing additional reverse map entries. When a reverse map table is generated, one of the reverse map entries in one of the reserved fields of the page frame data structure is moved to the reverse map table. A pointer to the reverse map table is placed in the now-vacant reserved field. Indexes in the page table entries are used to identify and remove the reverse map entries when a page table is deallocated. Reverse map tables can be generated as needed and can be dynamically sized to accommodate any number of reverse map entries.

20 Claims, 15 Drawing Sheets

REVERSE MAPPING PAGE FRAME DATA STRUCTURES TO PAGE TABLE ENTRIES

CROSS-REFERENCE TO OTHER APPLICATIONS

This patent application is related to the following commonly owned United States utility application:

"System, Method and Computer Program Product for Inter-Cell Page Sharing in a Distributed Shared Memory System," by Curt F. Schimmel, filed concurrently herewith, allowed U.S. patent application Ser. No. 08/933999, incorporated herein by reference, in its entirety.

BACKGROUND OF THE INVENTION

1. Field of the Invention

The present invention relates to reverse mapping of memory to data structure references, such as, for example, page table entries.

2. Related Art

In computer systems, a data structure can reference a page of data by referencing, or pointing to, the physical location of the data. For example, in a virtual memory mapping scheme, page table data structures store virtual memory address-to-physical memory address translations. Page tables include page table entries that reference mapped pages of memory. When activity affects a page of memory, page table entries that reference the page of memory must be updated or deleted.

Activity that can affect a page of memory includes moving the data in the memory to another location, such as hardware-based page migration. If the data is moved from a first page of memory to a second page of memory, any references to the page, such as page table entries that referenced, or mapped, the first page of memory must be updated to reference the second page of memory. However, there is currently no easy way to identify all of the references that need to be updated.

Activity that can affect a page of memory also includes delete operations and virtual cache coherency operations. For example, a virtual cache coherency scheme can, at times, require that a page of data not be mapped to more than one virtual address at a time. When this requirement is encountered, it is necessary to delete or invalidate all but one page table entries that map the page of memory to different virtual addresses. Virtual cache coherency is discussed in Schimmel, *UNIX Systems for Modern Architectures, Symmetric Multiprocessing and Caching for Kernel Programmers*, Addison-Wesley, at, for example, pp. 59–81 (1994), incorporated herein in its entirety by reference.

Activity that can affect a page of memory also includes file truncations. Existing systems handle file truncation by associating a linked list with a data structure that represents a file. The linked list identifies each user that mapped a portion of the file, such as page table addresses that map a portion of the file. When a portion of a file is truncated, the linked list is searched for users of the truncated portion so that associated page table entries can be deleted. Existing systems perform virtual cache coherency operations by searching the linked list described above and deleting page table entries as necessary. However, the linked lists can become very large and, hence, time consuming to search.

Activity that can affect a page of memory also includes paging activity such as page aging and page out operations. In a virtual memory paging system, there are typically more virtual pages than can fit in memory. Sometimes, virtual pages must be removed from memory to make room for others. A page aging system can be used to determine which pages to remove, by determining which pages are no longer in use. For example, a page aging system can turn off a valid bit in each page table entry that refers to a physical page. When a process refers to a page table entry that has a valid bit turned off a page fault occurs. The page fault can then be used to determine that the page that is referred to by the page table entry is still in use. The valid bit for that page table entry can then be turned back on. Pages that are referenced by page table entries that are not referenced again are candidates for removal.

When a page is identified for removal, a page out operation is used to eliminate page table entries that refer to page. A page out operation must identify all page table entries that reference the page and clear the page table entry. Currently, there is no fast and efficient way to identify page table entries that refer to physical pages and thus no fast and efficient way to perform page aging and page out operations.

Copies of page table entries can be cached in hardware items such as translational look-aside buffers (TLBs). Thus, when activity affects the page of memory, cached copies of page table entries that reference the page of memory must also be updated or deleted.

Existing systems maintain TLB coherence by broadcasting TLB flush commands to every TLB in a system, whenever any page table entry is changed or invalidated. This results in a large number of TLB misses because a large number of valid translations are unnecessarily invalidated.

UNIX System V, release 4, employs a hardware address translation (HAT) layer to set up page tables and associative memory entries. The HAT layer includes support functions for page table entries. For example, a hat_free( ) instruction removes all of the page table entries that are associated with an address space. The function is called when an address space is being deleted. When this function is invoked, all of the page table entries that are associated with the HAT structure for the address space are set to zero (i.e., invalidated). For additional information on UNIX System V, Release 4, see "*The Magic Garden Explained, The Internals of UNIX System V Release 4, An Open Systems Design*," by Berny Goodheart and James Cox, Prentice Hall, 1994. For specific details of UNIX System V, Release 4, HAT layer, see *The Magic Garden Explained*, chapter 3 and pages 96–105.

Thus, existing methods for identifying and updating or deleting references to mapped pages of memory are inadequate.

What is needed is a system, method and computer program product for identifying data structures that reference a page of memory and for updating or removing the references when the referenced data is moved or deleted.

SUMMARY OF THE INVENTION

The present invention is a system, method and computer program product for reverse mapping a page of memory to one or more data structure references, such as page table entries, that reference the page of memory. When an action is performed on the page of memory, reverse map entries are used to identify the references. Once identified, the references can be updated or deleted.

The present invention reserves a number m of fields of a page frame data structure (PFDAT) for storing reverse mapping data for a page of memory. A page frame data structure is a data structure that stores identification and state information for a page of memory. Each reserved field of the PFDAT can store a reverse map entry for pointing to a data structure reference, such as a page table entry, that references the page of memory. Thus, the number m of reserved field can store up to m reverse map entries for pointing to up to m data structure references.

Where a number n of references to the page of memory is greater than the number m of reserved fields, a reverse map table is generated for storing additional reverse map entries. When a reverse map table is generated, one of the reverse map entries in the page frame data structure is moved to the reverse map table. A pointer to the reverse map table is then placed in the now vacant reserved field. Reverse map tables can be generated as needed and can be dynamically sized to accommodate any number of reverse map entries.

In one embodiment, two fields are reserved in a page frame data structure so that up to two reverse map entries can be stored in each page frame data structure. This provides fast forking capability because a second reverse map entry can be quickly placed into a page frame data structure for pointing to a duplicated page table entry. Fast forking is also provided by reverse map tables because additional reverse map entries can be quickly placed in the tables.

The present invention can be employed as part of a virtual memory mapping scheme for reverse mapping page frame data structures that represent pages of memory to page table entries that reference the pages of memory.

The present invention can be employed in a virtual memory mapping scheme of a distributed, shared memory (DSM) system for identifying and updating page table entries when a page of mapped data is migrated from a first page of memory to a second page of memory. A reverse map entry that is associated with a first page frame data structure for the first page of memory is used to identify a page table entry that references the first page of memory. The page table entry is updated to reference the second page of memory and a reverse map entry is associated with a second page frame data structure that represents the second page of memory.

The present invention can be employed for file truncations. When a portion of a file is truncated, the truncated portion is deleted from memory. If the page frame data structures that map the truncated pages include any reverse map entries, the reverse map entries are used to identify and invalidate references, such as page table entries, that reference the truncated page or pages of the file.

The present invention can be employed in a virtual cache coherency scheme. When two users map the same data from the same file, a page table for each of the users includes a page table entry for the portion. When the two users map the same data to the same virtual address, then virtual cache coherency will be maintained. However, if the two users map the same data to different virtual addresses, then coherency could be affected. In these situations, a virtual cache coherency scheme prohibits the latter scenario, (i.e., mapping of the same data to different virtual addresses at the same time). When this occurs, one of the two page table entries for the data must be invalidated. Reverse map entries can be used to identify the references to the different mapped locations so that all but one reference can be invalidated.

In one embodiment, page table entries are provided with an index field that can store an index to a reverse map entry that points to the corresponding page table entry. When the page table entry is removed or if the corresponding page table is deallocated, if the reverse map entry is stored in a reverse map table, the index is used to identify and remove the reverse map entry. This avoids having to search the reverse map table for the reverse map entry and thus allows fast exiting.

In another embodiment, a page frame data structure that represents a page of memory that stores a page table includes data that identifies translational look-aside buffers (TLB) that may store a copy of one or more page table entries of the page table. When any page table entry in the page table is invalidated, the data in the page frame data structure is used to identify the TLB(s) that cached any page table entry from the page table. The identified TLB(s) are then flushed.

The present invention can be used to promote cell recovery in an inter-cell page sharing, fault isolated, distributed shared memory (DSM) system as disclosed in co-pending U.S. application, "System, Method and Computer Program Product for Inter-Cell Page Sharing in a Distributed Shared Memory System," by Curt F. Schimmel filed concurrently herewith, U.S. patent application Ser. No. 08/93399, incorporated herein by reference, in its entirety.

In an inter-cell page sharing environment, when a first cell imports a page of memory from a second cell, a proxy page frame data structure is generated in the first cell for storing identification and state information for the imported page of memory. When a data structure in the first cell references the imported page of memory, the proxy page frame data structure is provided with a reverse map entry to the data structure reference.

For example, if the first cell maps the imported page of memory, a page table entry in the first cell references the imported page of memory. When this happens, a reverse map entry is associated with the proxy page frame data structure to point to the page table entry. When the import is terminated, the reverse map entry is used to identify and invalidate the page table entry.

One advantage of the present invention is that reverse maps provide quick identification of data structure references, such as page table entries that reference the page of memory, when activity affects a page of memory.

Another advantage of the present invention is fast forking with little overhead. This is achieved by reserving space for multiple reverse maps in a PFDAT. When a page table entry in a first page table references a page of memory, a first reverse map entry that points to the page table entry is placed in a page frame data structure that represents the page of memory. When a fork operation duplicates the first page table, it generates an (at least temporarily) identical second page table that includes a copy of the page table entry that references the page of memory. As a result, the page frame data structure that represents the page of memory must be updated with a second reverse map entry that points to the second page table entry. Fast forking is achieved since the second reverse map entry can be placed directly in the page frame data structure or in a reverse map table that is associated with the page frame data structure.

Further features and advantages of the present invention, as well as the structure and operation of various embodiments of the present invention, are described in detail below with reference to the accompanying drawings.

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Table of Contents

Figure 1:
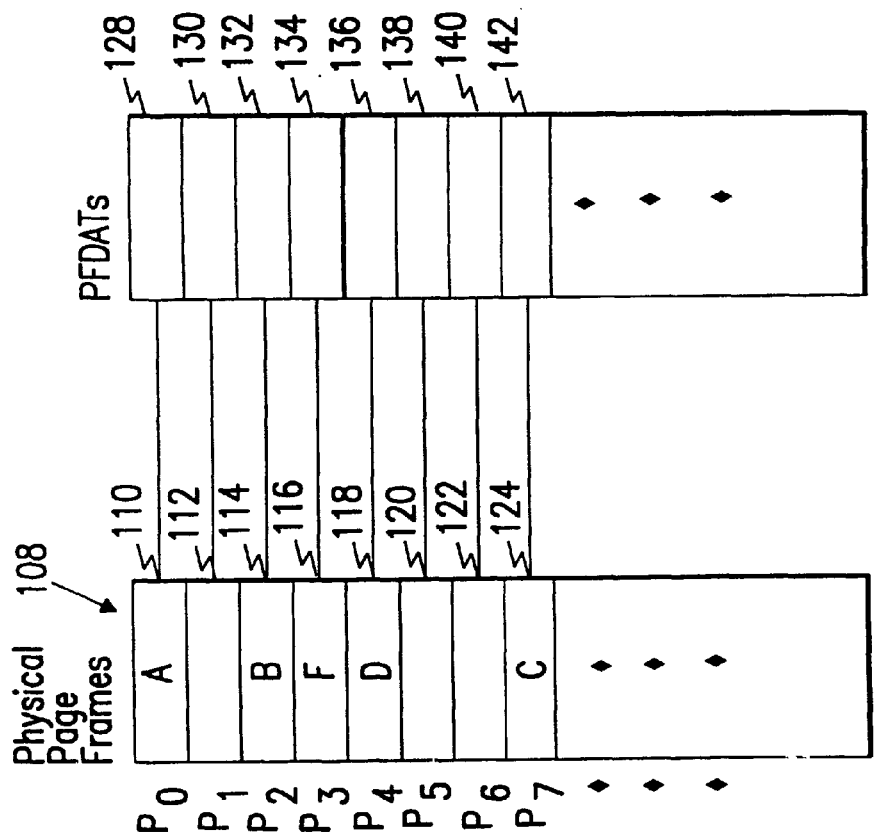
FIG. 1 is a block diagram illustrating a relationship between pages of memory and page frame data structures that represent the pages of memory.

1. Overview
2. Example Environment
   A. Page Frame Data Structures
   B. Page Table Data Structures
3. Reverse Mapping Memory to Referencing Data Structures
4. Indexing Page Table Entries to Reverse Map Entries
5. Identifying TLBs that Store Copies of Page Table Entries
6. Conclusions

1. Overview

The present invention is a system, method and computer program product for reverse mapping memory to data structures that reference the memory. When a data structure references a page of memory, a reverse map entry is placed in a page frame data structure that represents the page of memory. When an action is performed on the page of memory, the reverse map entry is used to identify and remove, or update, the reference in the data structure.

The present invention is described herein as implemented in a virtual memory mapping environment wherein page table entries reference pages of memory. The examples herein are provided to assist in the description of the present invention, not to limit it. As would be apparent to a person skilled in the art, the present invention can be implemented on any computer system in which data structures can reference pages of memory.

The present invention reserves a number m of fields of a page frame data structure (PFDAT) for storing reverse mapping data for a page of memory. A page frame data structure stores identification and state information for a page of memory. Each reserved field can store a reverse map entry for pointing to a data structure reference, such as a page table entry, that references the page of memory that is represented by the page frame data structure. Thus, the number m of reserved field can store up to m reverse map entries for pointing to up to m data structure references.

Where a number n of references to the page of memory is greater than the number m of reserved fields, a reverse map table is generated for storing additional reverse map entries. When a reverse map table is generated, one of the reverse map entries in one of the reserved fields in the page frame data structure is moved to the reverse map table. A pointer to the reverse map table is placed in the now vacant reserved field. Reverse map tables can be generated as needed and can be dynamically sized to accommodate any number of reverse map entries.

When a page table or a page table entry is deleted, de-allocated or abandoned, reverse map entries that point to the page table or page table entry should be removed. When reverse map entries are stored in a PFDAT that represents the page of memory, the PFDAT can be searched for the reverse map entries. Since a PFDAT only stores a small number of reverse map entries, typically up to two reverse map entries, the PFDAT search takes an inconsequential amount of time.

However, when a reverse map entry is stored in a reverse map table, since a reverse map table can store thousands of reverse map entries, a search of a reverse map table can take a substantial amount of time. Thus, in one embodiment, each page table entry of a page table is provided with an index field for storing an index to a corresponding entry in the reverse map table. When the page table or a page table entry is deleted, de-allocated or abandoned, if a reverse map entry is stored in a reverse map table, the corresponding page table entry index is used locate and remove the reverse map entry.

In another embodiment, a page frame data structure that represents a page of memory that stores a page table is provided with information for identifying one or more translational look-aside buffers (TLBs) that may store copies of page table entries from the page table. When a page table entry from the page table is deleted or updated, the TLB identification data in the page frame data structure is used to identify and flush the TLBs. This information can be used in conjunction with reverse map entries to target TLB flushes to specific CPU's when page table entries are updated or deleted.

Throughout this specification reference is made to pages of memory and page frames. Wherever a page of memory or a page frame is referred to, it is to be understood that any unit of memory is intended, including, but not limited to, page, segment, block and individual memory cells.

Conventional operating systems generate data structures to represent pages of physical memory and to store state information for the page of memory that it represents. These data structures can be implemented in a variety of ways and referred to by a variety of names. For example, in Silicon Graphics' IRIX operating system, these data structures are referred to as page frame data structures, or PFDATs. A PFDAT contains identification and state information for its associated page frame.

Throughout the remainder of this specification, the terms page frame data structure and PFDAT are used interchangeably to refer to data structures that represent pages of physical memory. Whenever a page frame data structure or a PFDAT is referred to, it is to be understood that it is used in a broad sense to refer to any data structure that is employed to represent pages of physical memory.

Conventional operating systems generate data structures to represent memory objects and to store state information for memory objects. Memory objects can include regular files as well as anonymous memory objects such as, for example, stacks, heaps, UNIX System V shared memory and /dev/zero mappings. A memory object can be backed by a disk file and, hence, can be larger than physical memory. The operating system manages which portion of the memory object occupies memory at any given time.

Data structures that represent memory objects can be implemented in a variety of ways and referred to by a variety of names. In Silicon Graphics' IRIX operating system, for example, regular files are represented by VNODE data structures. Throughout the remainder of this specification, the term memory object data structure is used to refer to data structures that represent memory objects. Wherever the term memory object data structure is used, it is used in a broad sense to refer to any data structure that represents a memory object.

When a page of memory stores a page of a memory object, the PFDAT that represents the page of memory generally includes a pointer to the memory object or to a data structure that represents the memory object. Where memory is divided into pages, the operating system needs to know which portion of a memory object is contained in a page of memory. Thus, the PFDAT generally includes a logical offset, as well. The logical offset identifies a portion of the memory object, relative to the beginning of the memory object.

2. Example Environment

The present invention can be implemented in a variety of computer systems and environments, including, but not limited to, uni-processor computer systems, shared memory, symmetric multi-processing (SMP) systems and distributed shared memory (DSM) multi-processor systems. For example, the present invention can be implemented as software in an IRIX™ or Cellular IRIX™ operating system executed by an Origin™ scalable, distributed shared-memory multi-processor platform, manufactured by Silicon Graphics, Inc., Mountain View, Calif.

A system, method and computer program product for reverse mapping memory to data structures that reference the memory are described as implemented in a system that employs a virtual memory mapping scheme. The examples provided herein are to assist in the description of reverse mapping memory to data structures that reference the memory, not to limit the present invention to virtual memory mapping schemes.

A. Page Frame Data Structures

Conventional computer systems typically divide main memory into pages of memory in order to simplify hardware. For example, referring to FIG. 1, a memory 108 is divided into a number of page frames 110–124. Each page frame 110–124 is represented by a PFDAT 128–142, respectively. The operating system uses PFDATs 128–142 to store state information related to the associated page frames 110–124 and to locate pages of memory objects that are stored in memory 110–124.

Preferably, the address of a page of memory that a PFDAT represents is stored implicitly by noting the relative position of the PFDAT in memory. From the relative position of the PFDAT, the physical page address can be computed. This method of identifying a physical page address is generally preferred because it saves storage overhead by not storing a pointer.

Figure 2:
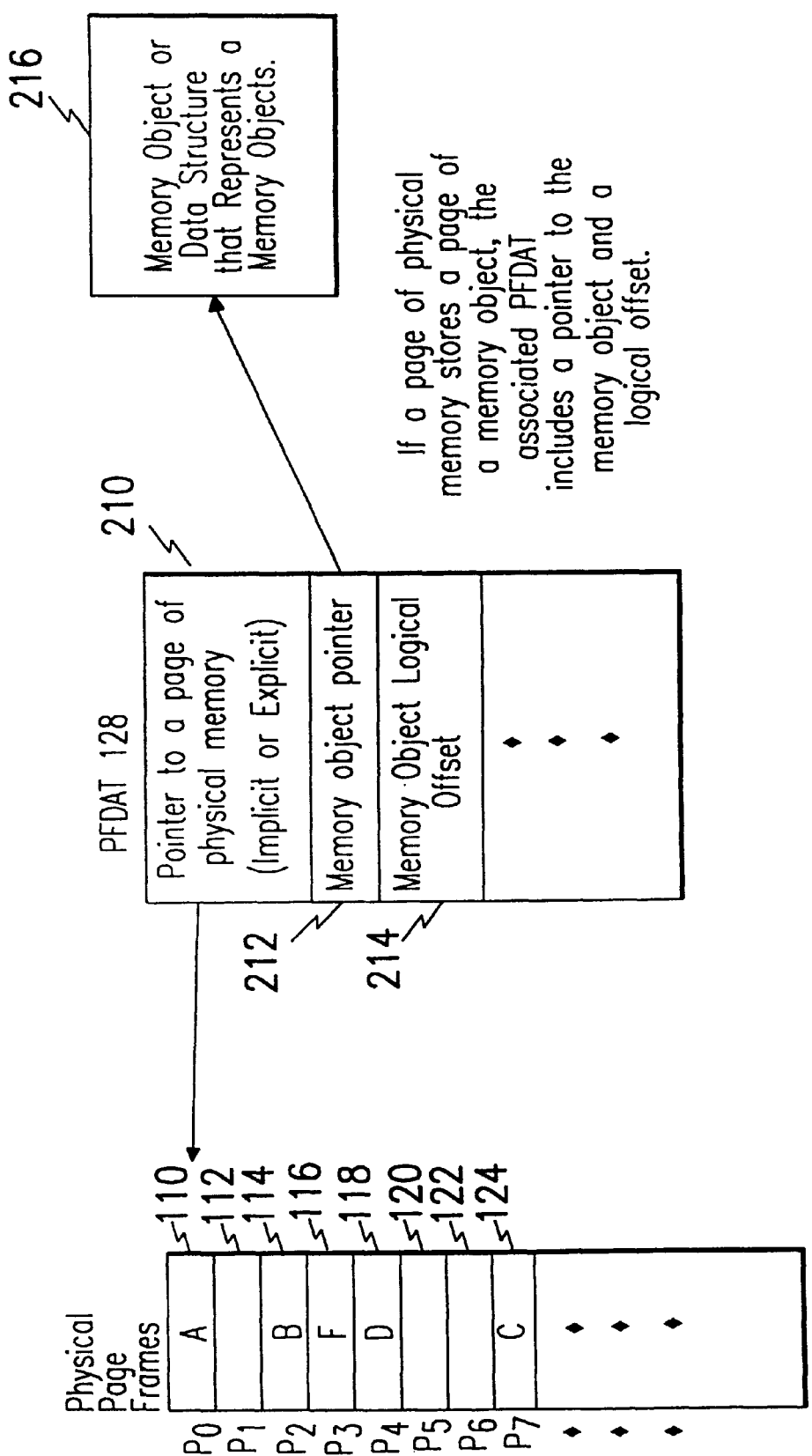
FIG. 2 is a block diagram illustrating a relationship between a page of memory that stores a portion of a memory object, an associated page frame data structure and a data structure that represents the memory object.

Alternatively, PFDATs 128–142 can store a pointer to a page of physical memory that the PFDAT represents. For example, referring to FIG. 2, PFDAT 128 can include a pointer 210 that points to associated page 110 of physical memory. As would be apparent to a person skilled in the art, other methods of identifying physical page addresses from PFDATs can be employed.

When a page of physical memory stores a page of a memory object, the associated PFDAT includes a reference to the memory object. Preferably, the reference includes a memory object identification and a logical offset within the memory object. The memory object identification can be a pointer to a data structure that represents the memory object. The logical offset identifies a portion of the memory object, relative to the beginning of the memory object.

For example, when memory page 110 stores a page of a memory object, PFDAT 128 includes a pointer 212 and a logical offset 214. Pointer 212 points to a memory object data structure 216 that represents the memory object. Logical offset 214 indicates a logical offset of the memory object that is stored.

Computer operating systems employ PFDATs, such as PFDATs 128–142, to store state information for pages of memory. PFDATs 128–142 can include fields for indicating, for example, whether data stored within the associated page of physical memory is clean or dirty and for indicating the current number of users of the data stored in the associated page of memory.

Computer operating systems also employ PFDATs, such as PFDATs 128–142, to determine whether, and where, pages of memory objects are stored in physical memory. The operating system can search PFDATs for memory object identifications and logical offsets. For example, when a user directs the operating system to delete a memory object, any pages in memory that are associated with the memory object must be found and de-allocated. The operating system searches PFDATs to determine whether any of them store a pointer to the memory object.

As another example, when the operating system needs to locate a page of a memory object, the operating system searches the PFDATs for the logical offset of the page. The search identifies a PFDAT if the PFDAT stores the memory object identification and logical offset that is being searched for. From the PFDAT, the physical address of the page can be determined.

In order to facilitate efficient searching or translation of memory object identification and logical offsets into the corresponding PFDAT, PFDATs that are associated with memory objects are organized into a data structure, called a page cache. A page cache maps between logical offsets of memory objects and physical pages of main memory. Thus, given a memory object identification and logical offset, a page cache mapping and searching function can identify a page of physical memory which contains the data. PFDATs can be inserted and deleted from the page cache as needed.

A page cache is generated by organizing PFDATs that are associated with memory objects (i.e., PFDATs that represent memory that stores portions of memory objects) into a searchable data structure. PFDATs can be organized in a variety of fashions, including linked lists, hash tables, tree structures, etc.

Preferably, a separate page cache of PFDATs is provided for each memory object so that each page cache associates only PFDATs that store pages of the memory object. Alternatively, a global page cache can be employed. Distributed page caches and global page caches are disclosed in more detail in copending U.S. patent application, "System, Method and Computer Program Product for Distributing Page Caches," by Curt F. Schimmel, filed concurrently herewith, Application Ser. No. (to be assigned), Attorney Docket No. 15-4-465.00 (1452.2350000), filed concurrently herewith and incorporated herein by reference in its entirety.

B. Page Table Data Structures

Computer systems typically run multiple processes or threads at a time. Each process requires some amount of memory. Often, memory is limited and must be allocated among the different processes. In order to allocate limited memory among multiple processes, computer systems employ virtual memory mapping schemes. Virtual memory mapping schemes divide memory into pages and allocate the pages to the different processes. Memory that is so allocated is referred to as mapped memory.

In a virtual memory mapping scheme, each process that is allocated a page of memory is also provided with a set of translations for translating virtual addresses to physical addresses within the allocated page. A variety of schemes are available for providing virtual memory address-to-physical memory address translations. The most common scheme is a forward page table scheme. Page tables can be implemented in a variety of ways, such as a sparse array.

Page tables have page table entries for storing physical addresses of mapped data. Page table entries are implicitly indexed by virtual page addresses. A physical address of a mapped page of data can be retrieved from a page table entry that is associated with an implied virtual address.

Figure 3:
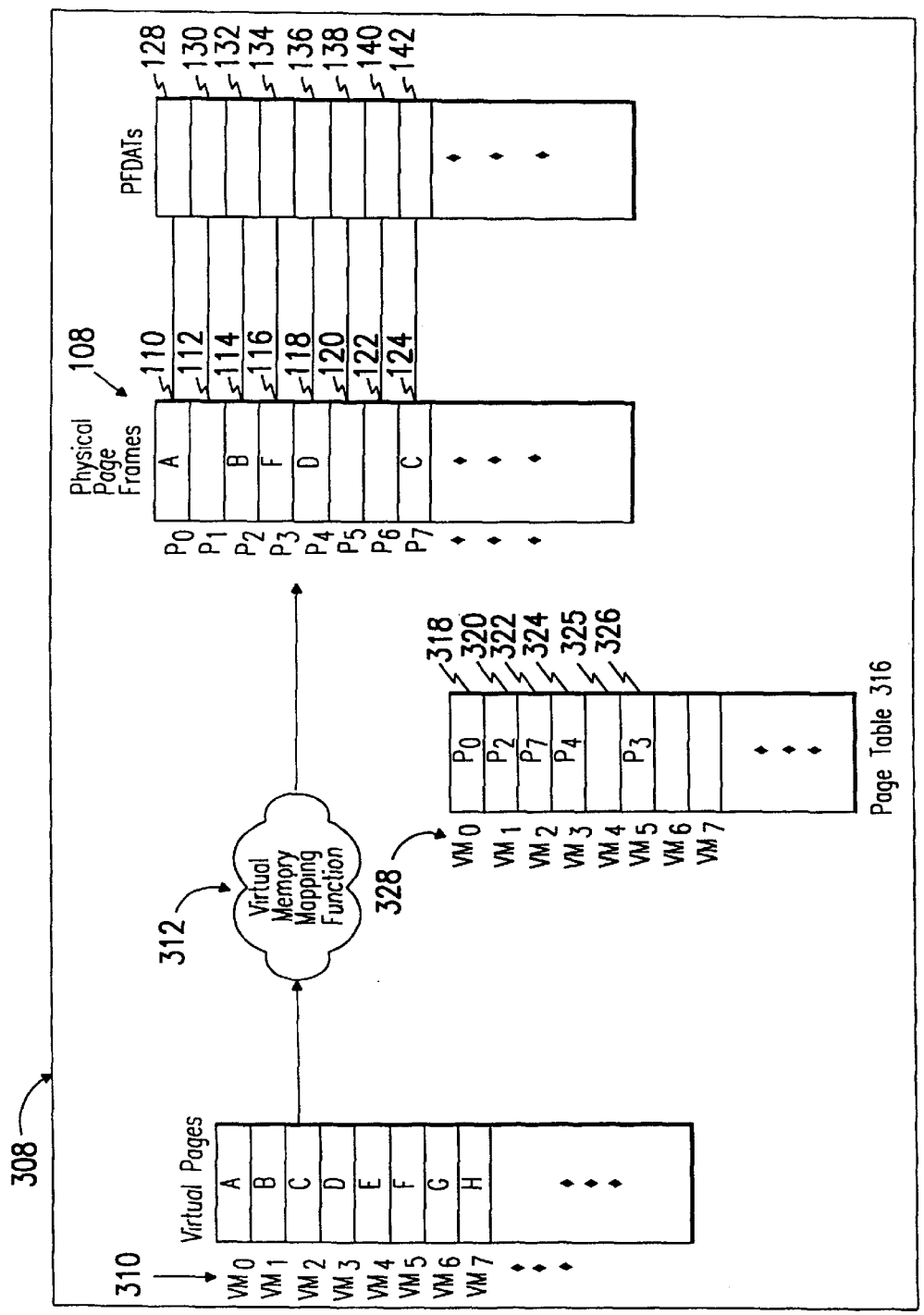
FIG. 3 is a block diagram illustrating a virtual memory mapping scheme.

Referring to FIG. 3, a virtual memory mapping scheme 308 is illustrated for virtual memory addresses 310 ($VM_0$–$VM_7$). A virtual memory mapping function 312 maps data associated with virtual memory addresses 310 to memory 108. A forward page table 316 provides virtual memory address-to-physical memory address translations. Each user or application that is allotted a portion of physical memory can be provided with a separate page table 316. In some cases, page tables can be shared. Each page table 316 includes a set of page table entries (PTEs) 318–326 for storing physical addresses and control information such as a valid bit, permission bits, etc. A user or application that is running on a processor can reference virtual pages A–H using their virtual memory addresses or offsets. A processor translates the virtual memory address to a physical memory address and accesses the physical memory location. PTEs 318–326 can also be referenced by a physical address at which each PTE is stored.

Virtual memory addresses 328 can be referred to as implied virtual memory addresses because page table 316 does not have to include specific virtual memory addresses. Instead, the first PTE 318 is impliedly, or automatically, associated with the first virtual memory page. Similarly, the second PTE 320 is impliedly associated with the second virtual memory page.

In this example, the first virtual memory page A is stored in page $P_0$ (110). Thus, first PTE 318 references $P_0$. Similarly, second virtual memory page B is stored in page $P_2$ so the second PTE 320 references $P_2$. Third virtual memory page C is stored in page $P_7$ so third PTE 322 references $P_7$. Fourth virtual memory page D is stored in page $P_4$ so fourth PTE 324 references $P_4$. Fifth virtual memory page E is not stored in physical memory 108. Thus, fifth PTE 224 does not reference any page of physical memory. A reference to E will thus result in a page table miss or page fault and page E will have to be retrieved from disk.

Another way of describing page table 316 is as an array that is indexed by the virtual page number of the desired mapping. For example, if virtual address is 0×1000 and the page size of a system is 4K bytes (i.e., 0×1000 bytes), then the virtual page number is the virtual address divided by the page size, or 0×10. The PTE for page 0×10 can be found by simply looking at index 0×10 in the page table array. The starting address of the array itself is maintained by the operating system in such a way that it is easy to find. Alternatively, the work can be done in hardware where the base address of the page table array is loaded into a special hardware register inside a translational look-aside buffer (TLB).

Virtual address spaces are usually much larger than the amount of physical memory in a system. Thus, forward page tables, such as page table 316, are usually implemented as sparse arrays.

The array implementation of a page table 316 is just one possible data structure for translating virtual memory addresses to physical memory addresses. As would be apparent to one skilled in the art, other data structures can be employed. For example, a reverse page table can be employed where the number of page table entries equals the number of virtual pages that are stored in physical memory. When a translation is needed, the page table is searched for an entry that is tagged with the virtual address that is needed. Reverse page tables are typically implemented with a hash table.

Additional details of virtual memory management can be found in, for example: Schimmel, "*UNIX Systems for Modern Architectures, Symmetric Multiprocessing and Caching for Kernel Programmers,*" pp. 7–8; and Goodheart and Cox, "*The Magic Garden Explained,*" pp. 69–140, Prentice Hall, 1994, incorporated herein by reference.

If mapped data is moved from a first page of memory to a second page of memory, any data structures that reference the first page of memory, such as a page table entry, must be identified and updated or de-allocated. In addition, any copies of the page table entries that are cached in a translational look-aside buffer (TLB), must be flushed or invalidated.

3. Reverse Mapping Memory to Referencing Data Structures

The present invention is a system, method and computer program product for reverse mapping memory to data structure references, such as page table entries. The present invention provides a fast and convenient way to identify references to memory and copies of the references so that, when there is activity directed at the memory, the references and copies of the references can be updated or invalidated.

The present invention is described as implemented in a virtual memory mapping environment where page table entries reference mapped memory. The virtual memory mapping example is provided to assist in the description of reverse mapping, not to limit the present invention.

The present invention reserves a number m of fields of a page frame data structure for storing reverse mapping data. The reverse mapping data identifies references in data structures, such as page table entries 318–326 in page table 316, that reference a page of memory that is represented by the page frame data structure. The number m of reverse mapping fields can be used for storing m reverse map entries or m−1 reverse map entries and a pointer to a reverse map table that stores additional reverse map entries.

Figure 4:
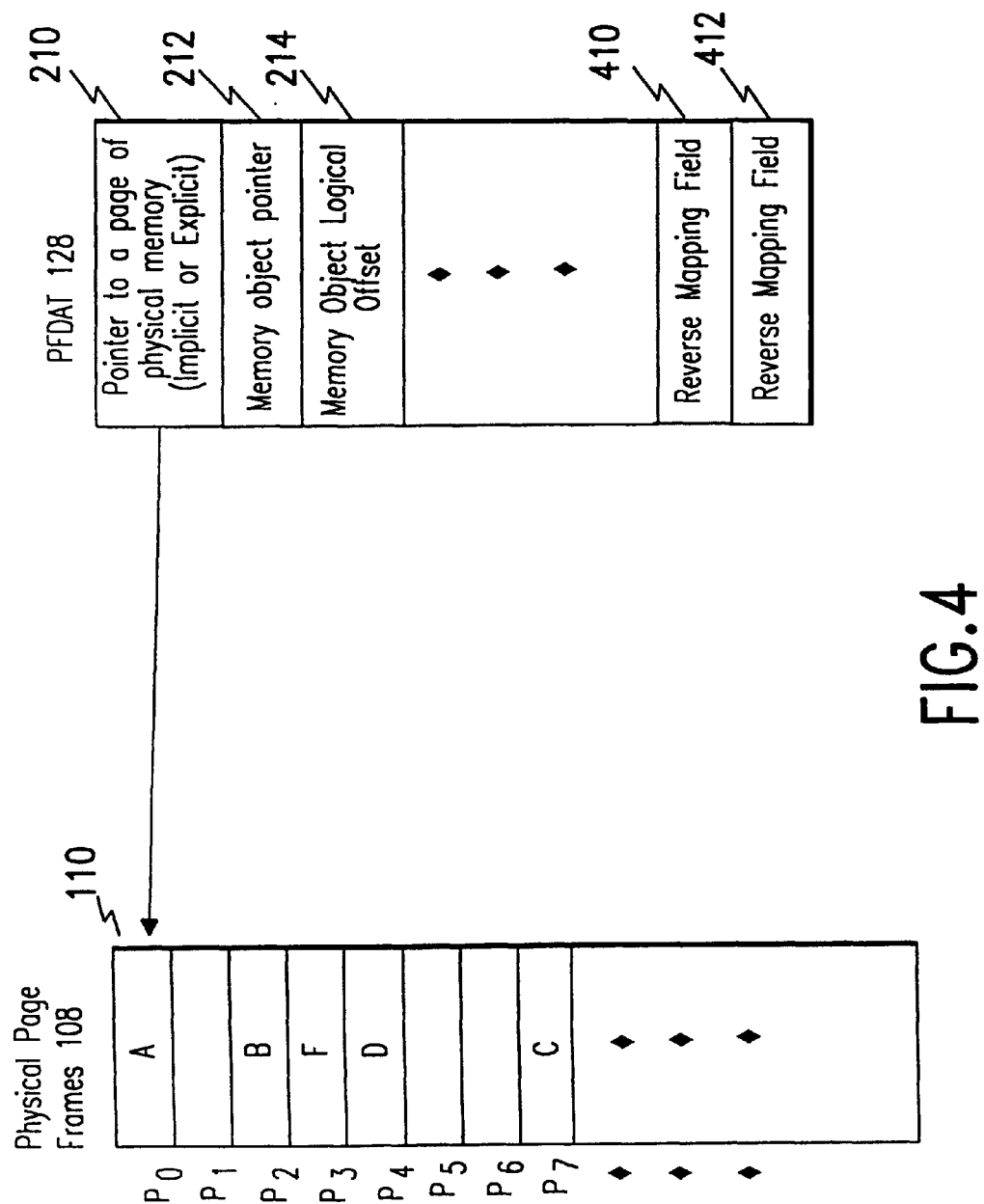
FIG. 4 is block diagram illustrating a page frame data structure that includes two fields for storing reverse map data, according to the present invention.

In one embodiment, the number m of reserved fields is two. For example, referring to FIG. 4, page frame data structure 128 includes two reverse mapping fields 410 and 412. Reverse mapping fields 410 and 412 can be used for storing up to two reverse map entries or for storing one reverse map entry and a pointer to a reverse map table that contains one or more additional reverse map entries.

For example, in FIG. 3, data A is mapped from virtual memory $VM_0$ to physical page frame $P_0$ (110). Physical page frame 110 is represented by PFDAT 128. Page table 316 thus includes a reference to $P_0$ in page table entry 318. Where page table entry 318 is the only reference to page $P_0$ (110), i.e., no other data structure references $P_0$, only one reverse map entry is needed to identify references to $P_0$ (110).

Figure 5:
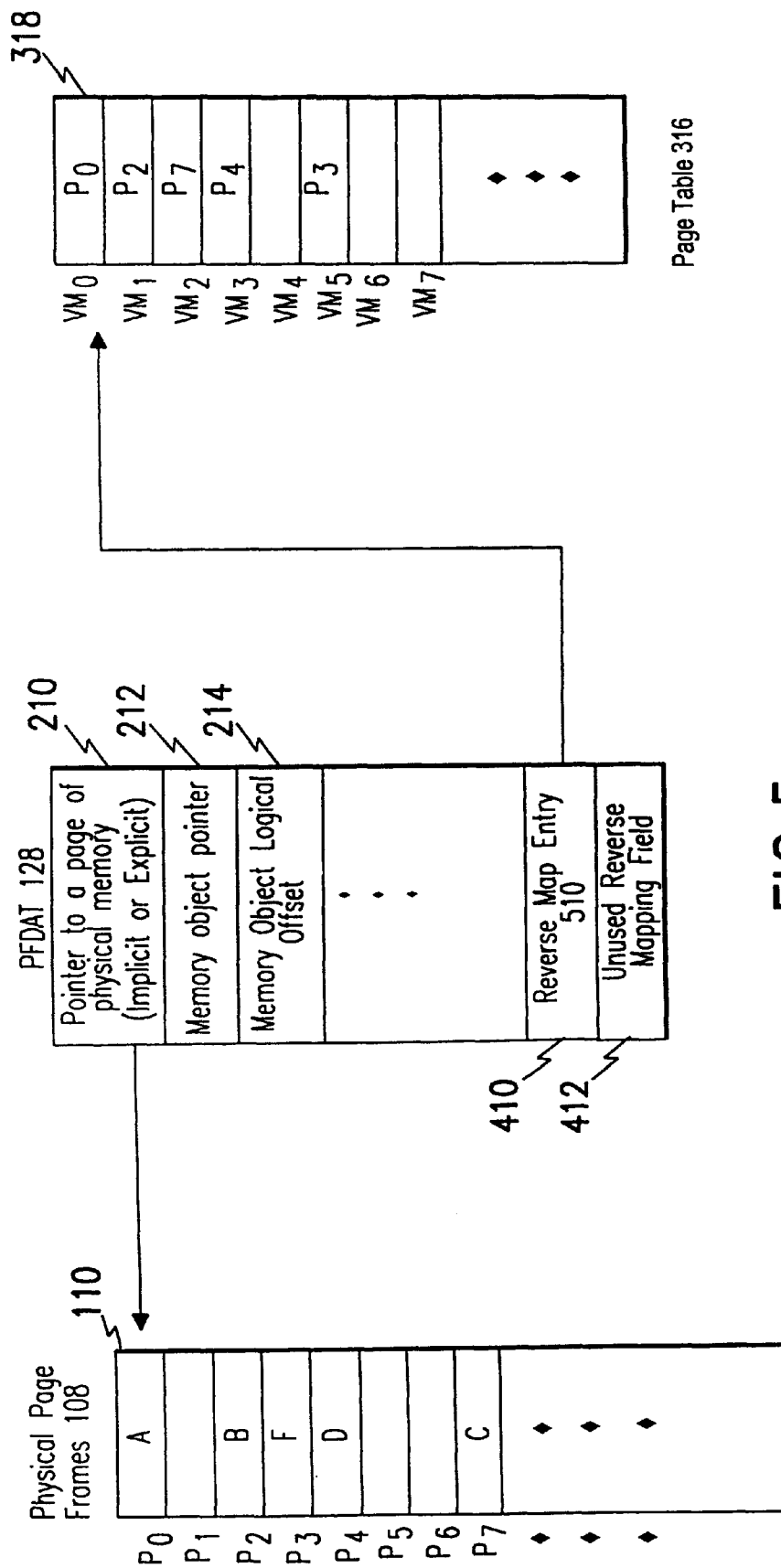
FIG. 5 is a block diagram illustrating the page frame data structure of FIG. 4, wherein one of the two reverse map fields stores a reverse map entry that points to a referencing page table entry, according to the present invention.

Referring to FIG. 5, the relationship between page frame 110, page frame data structure 128 and page table entry 318 is illustrated for the above example. In FIG. 5, page frame data structure 128 includes a reverse map entry 510 for pointing to page table entry 318, indicating that page table entry 318 references page frame 110, which is represented by page frame data structure 128.

If data A is moved or deleted from $P_0$ (110), the reference to $P_0$ (110) in page table entry 318 is no longer valid. Thus, the reference to $P_0$ (110) in page table entry 318 must be updated with a new reference or be deleted.

In order to locate references to $P_0$ (110), page frame data structure 128 is searched for reverse map data in fields 410 and 412. In this example, reverse map entry 510 points to page table entry 318 as referencing page frame $P_0$ (110). Once page table entry 318 is identified, the reference to page frame $P_0$ (110) can be updated or deleted.

Figure 6:
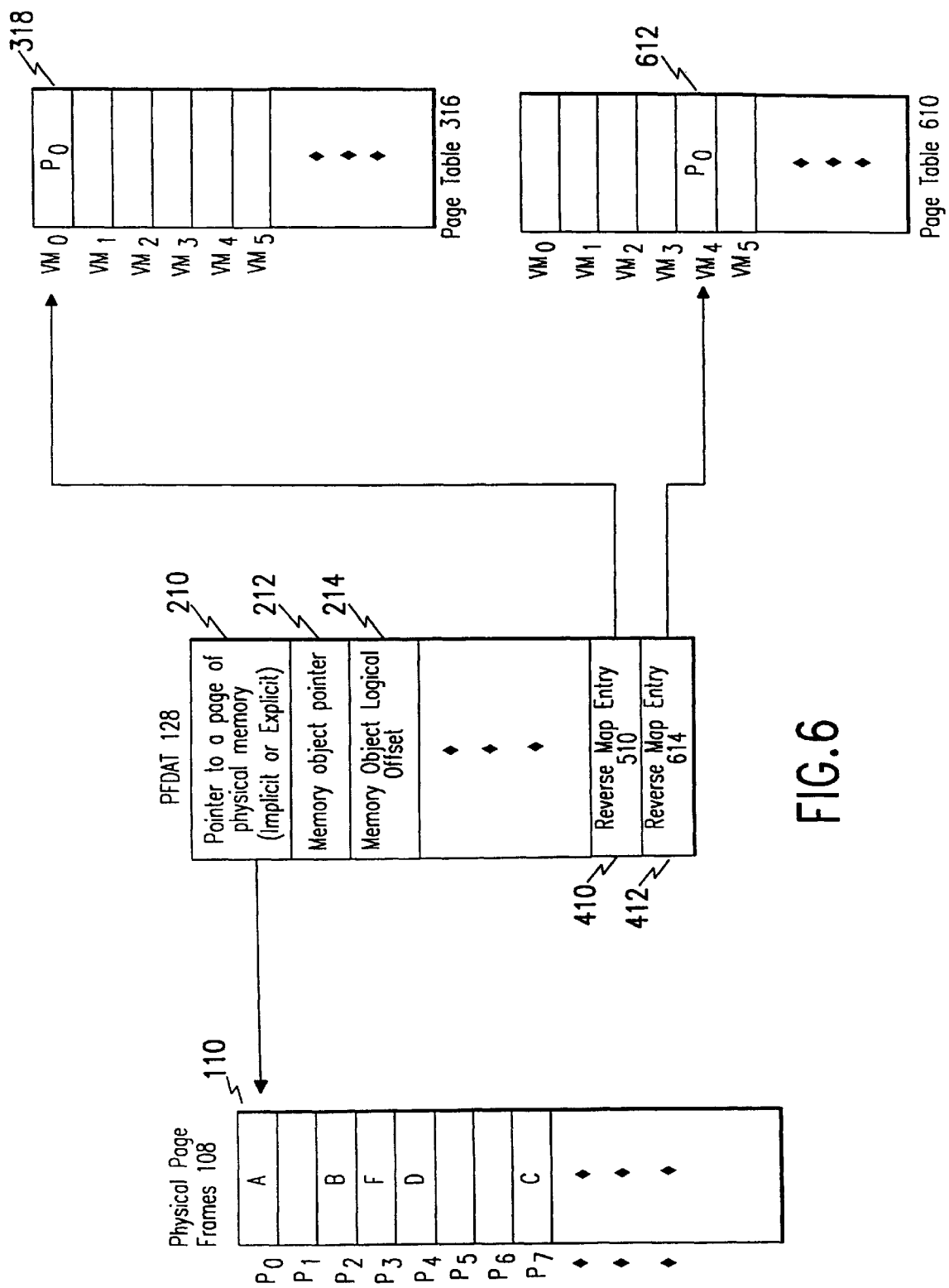
FIG. 6 is a block diagram illustrating the page frame data structure of FIG. 4, wherein each of the two reverse map fields store a reverse map entry, each reverse map entry pointing to a referencing page table entry, according to the present invention.

When a second data structure, such as a second page table entry, references page frame $P_0$ (110), a second reverse map entry can be placed in reverse mapping field 412 to point to the second page table entry. For example, referring to FIG. 6, a second page table 610 includes a page table entry 612 that references page frame $P_0$. A second reverse map entry 614 is placed in reverse mapping field 412 for pointing to page table entry 612.

If data A is moved or deleted from page frame $P_0$ (110), reverse map entries 510 and 614 are used to identify references to $P_0$ (110) in page table entries 318 and 612. Page table entries 318 and 612 can be updated with a new page frame address or deleted, as necessary.

When more than m, (i.e., more than two) data structures reference page $P_0$ (110), a reverse map table is generated for storing additional reverse map entries. For example, referring to FIG. 7, a third page table 710 includes a page table entry 712 that references page frame $P_0$. A third reverse map entry must be generated for pointing to page table entry 712. Since page frame data structure 128 includes only two reverse mapping fields 410 and 412, a reserve map table 718 is generated for storing additional reverse map entries. Reverse map entry 614 is moved from reverse mapping field 412 and is placed in reverse map field 720 of table 718 so that a pointer 714 to reverse map table 718 can be placed in reverse mapping field 412. A third reverse map entry 716 is generated for pointing to page table entry 712 and is placed in field 722 of reverse map table 718.

If data A is moved or deleted from page frame $P_0$ (110), the operating system uses reverse map entries 510, 614 and 716, respectively to identify and update page table entries 318, 612 and 712.

The present invention can be implemented for any number m of reserved reverse mapping fields 410, 412 and for any number n of referencing data structures.

In addition to providing a fast and convenient way to identify and update references to page frames, reverse mapping fields 410 and 412 provide fast forking capability. Fork operations permit multiple instances of a processing thread to be created. Forking often requires generation of duplicate page tables. Fork speed is a primary measuring standard that is employed in computer/computing industries.

A duplicated page table will initially include a second page table entry that references a same page frame data structures that is referenced by a first page table entry of the original page table. Assuming that a page frame data structure that represents the page frame already includes a reverse map entry to the first page table entry, a second reverse map entry can be quickly placed into page frame data structure, or into a reverse map table, for pointing to the second page table entry. The present invention thus provides quick reverse mapping of duplicated page tables so that fork speed is not adversely affected.

At any instant in time, data from virtual memory addresses 310 can be mapped to any of physical page frames 110–124. Thus, at any instant in time, associated page frame data structures 128–142 can include up to two reverse maps in fields 410 and 412 or a single reverse map in field 410 and a pointer to a reverse map table in field 412.

Figure 8:
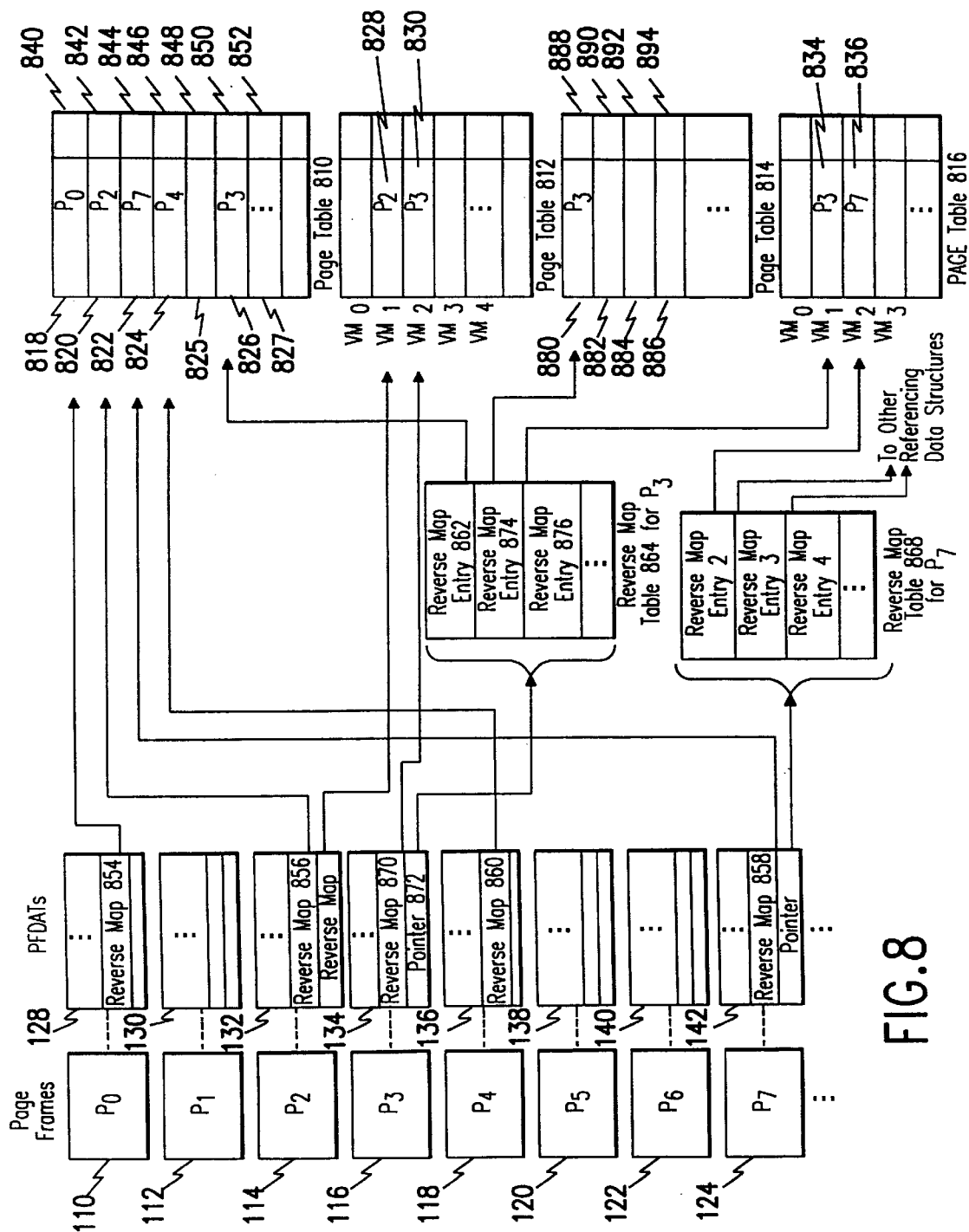
FIG. 8 is a block diagram of the pages of memory and associated page frame data structures illustrated in FIG. 1, wherein a plurality of the page frame data structures employ reverse maps and reverse map tables for pointing to data structure references, such as page table entries wherein page table entries include an index field for storing an index to reverse map entries, according to the present invention.

For example, referring to FIG. 8, four page tables 810, 812, 814 and 816 are illustrated. Page table entries in page tables 810–816 can include references $P_0$–$P_7$ to page frames 110–124. For example, page table entry 818 includes a reference to page frame $P_0$ (110). Page table entry 820 includes a reference to page frame $P_2$ (112), etc.

For each page table entry 818–836 and 880, there is an associated reverse map entry associated with page frame data structures 128–142 for mapping a referenced page frame to a reference. For example, page frame data structure 128 includes a reverse map entry 854 that points to page table entry 818. Similarly, page $P_3$ (116) is referenced by four page table entries 826, 830, 880 and 834. PFDAT 134, which represents page $P_0$ (116), thus includes a reverse map entry 870 that points to page table entry 830. PFDAT 134 also includes a pointer 872 to a reverse map table 864. Reverse map table 864 includes space for storing additional reverse map entries for $P_3$ (116). In this example, reverse map table 864 includes reverse map entry 862 that points to PTE 826, reverse map entry 874 that points to PTE 880 and reverse map entry 876 that points to PTE 834.

4. Indexing Page Table Entries to Reverse Map Entries

When a page table or a page table entry is deleted, de-allocated or abandoned, reverse map entries that point to the page table or page table entries should be removed. When a reverse map entry is stored in a PFDAT that represents the page of memory, the PFDAT can be searched for the reverse map. Since a PFDAT only stores a small number of reverse map entries, typically up to two reverse map entries, the PFDAT search takes an inconsequential amount of time. However, when the reverse map entry is stored in a reverse map table, since a reverse map table can store thousands of reverse map entries, a search of a reverse map table can take a substantial amount of time.

Thus, in one embodiment of the present invention, referred to herein as Option 1, page table entries are provided with references to reverse map entries that point to the page table entries. In one embodiment, a page table entry is provided with a reference to a reverse map entry only if the reverse map entry is stored in a reverse map table. When the page table entry or the whole page table is deleted, de-allocated or abandoned, the corresponding page table entry reference is used locate and remove the reverse map entry. This avoids having to search the reverse map table for the reverse map entry and thus allows fast exiting.

Referring to FIG. 8, under Option 1 of the present invention, each page table entry of page tables 810, 812, 814 and 816, includes a field for storing an index or a pointer to a reverse map entry. For example, page table entries 818–827 include corresponding fields 840–852, respectively, for storing indexes or pointers to reverse map entries. Similarly, page table entries 880–886 include corresponding fields 888–894, respectively, for storing indexes or pointers to reverse map entries.

Generally, indexes are preferred to pointers since pointers are typically larger than indexes and thus require more space. For example, in the Origin™ scalable, distributed shared-memory multi-processor platform, manufactured by Silicon Graphics, Inc., Mountain View, Calif., pointers are 64 bits. Throughout the remainder of this specification, whenever the term index is used, it is to be understood that it is used in a broad sense to refer to an index, a pointer, or any other system that references a page table entry to a reverse map entry.

When a reverse map entry that references a page table entry is stored in a page frame data structure, the corresponding index is set to, for example, zero. For example, reverse map entry 854, which points to page table entry 818, is stored in PFDAT 128. Thus a null value (not shown) is placed corresponding index field 840. When page table entry 818 is deleted, de-allocated or abandoned, the null value in corresponding page table entry index 840 indicates to the operating system that the reverse map entry that points to the page table entry (i.e., reverse map entry 854) is stored in the PFDAT for the page that is referenced by page table entry 818 (i.e., PFDAT 128 that represents page P₀ (110)). Reverse map entry 854 can be quickly found by searching the reserved fields of PFDAT 128 for the reverse map entry that points to page table entry 818.

When a reverse map entry that references a page table entry is stored in a reverse map table, the corresponding page table entry index is set to an index value that identifies the reverse map entry in the reverse map table. For example, reverse map entry 874, which points to page table entry 880, is stored in reverse map table 864. Thus, an index value (not shown) is placed in corresponding index field 888 that identifies the second reverse map field of reverse map table 864 as storing the reverse map entry that points to page table entry 880 (i.e., reverse map entry 874). When page table entry 880 is deleted, de-allocated or abandoned, the index stored in corresponding index field 888 is used to identify reverse map entry 874 in reverse map table 864. The reverse map entry can then be removed from the indexed reverse map table. Thus, a potential time consuming search of the reverse map table is avoided.

5. Identifying TLBs that Store a Copy of a Page Table Entry

In one embodiment, where the present invention is implemented with a virtual memory mapping scheme, and where a processor includes a translational look-aside buffer (TLB) for storing copies of page table entries, the present invention stores data for identifying TLBs that store copies of page table entries. A system, method and computer program product for storing data that identifies TLB is referred to herein as Option 2.

Figure 9:
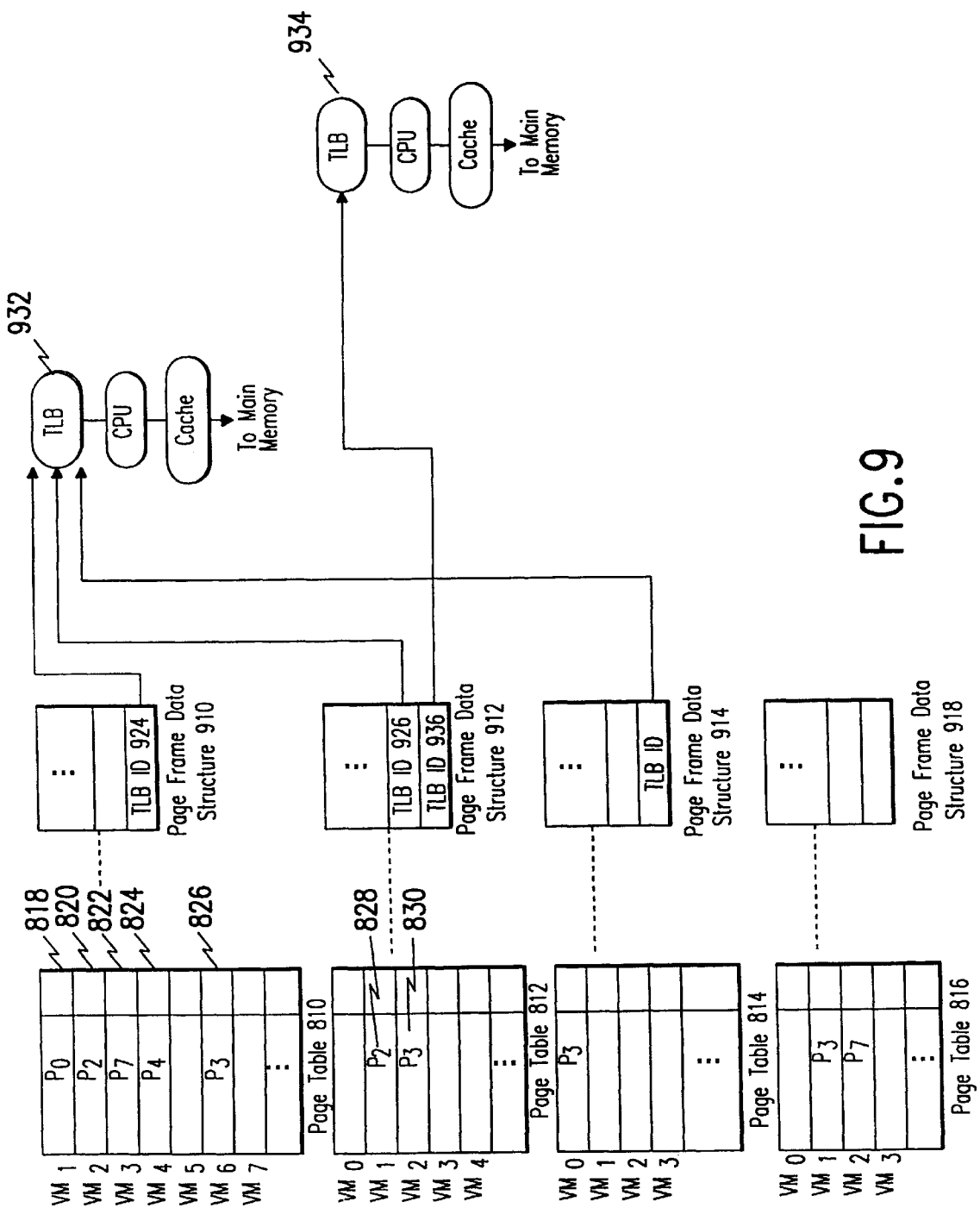
FIG. 9 is a block diagram of the page tables of FIG. 8, wherein page frame data structures that represent pages of memory that store the page tables include information for identifying translational look-aside buffers (TLBs) that store copies of page table entries, according to the present invention.

Referring to FIG. 9, page frame data structures 910, 912, 914, and 916 represent pages of memory that store page tables 810–816, respectively. Page frame data structures 910–916 store state information for page tables 810–816. Typically, less information is stored in a page frame data structure when the associated page of memory stores a page table than if the associated page of memory stored other types of data. As a result, there is typically unused memory space in PFDATs 910–916.

Option 2 of the present invention uses some of this unused space to store information for identifying one or more TLBs that store a copy of one or more page tables entries from the page table that is associated with the PFDAT. For example, when one of page table entries 818–826 is copied from page table 810 to TLB 932, TLB ID 924 is placed in page frame data structure 910 for identifying TLB 932. Similarly, when one or both of PTEs 828 or 830 is copied from page table 812 to TLB 932, TLB ID 926 is placed in page frame data structure 912 to identify TLB 932. Similarly, when one or both of PTEs 828 or 830 is copied to TLB 934, TLB ID 936 is placed in data structure 912 for identifying TLB 934.

When action is taken on data that is stored in a page of memory that is referenced by a PTE in page table 810 or by a PTE in page table 812, reverse map entries in page frame data structures 128–142 are used to update or delete the references in page tables 810 and 812. When a reference in page table 810 or 812 is updated or deleted, page frame data structures 910 and 912 are accessed to determine whether any TLB ID data is stored therein.

When TLB ID 924 is found in page frame data structure 910, TLB ID 924 is used to identify TLB 932 as potentially having a copy of PTE from page table 810. Since TLBs are typically small, PTEs are frequently overwritten. Thus, a copy of a PTE is potentially in TLB 932, but not necessarily, because the PTE might have been copied over by another PTE copy. TLB ID data, such as TLB ID 924, does not identify the precise location within TLB 932 where the reference is stored, nor does it identify which PTE is potentially cached within the TLB. Instead, TLB ID 924 simply identifies TLB 932 as potentially having a copy of one or more PTEs from the page table. When TLB 932 is identified, it is flushed of all references stored therein and TLB ID 924 is deleted.

Similarly, when a reference is updated or deleted from page table 812, associated page table data structure 912 is searched for TLB ID data. TLB ID 926 and 936 identify TLB 932 and TLB 934. Thus, TLB 932 and TLB 934 are flushed when a reference is updated or deleted from page table 812, regardless of which PTE is potentially stored in either TLB. TLB IDs 926 and 936 are then deleted from data structure 912.

To further emphasize the point, note that the PTE or PTEs from page table 812 that are stored in TLB 932 may be different from the reference or references that are stored in TLB 934. Moreover, the reference that is updated or deleted from page table 812 can be a reference that is stored only in TLB 932, stored only in TLB 934 or stored in neither TLB. Regardless, both TLB 932 and 934 are flushed when any reference is updated or deleted from page table 812. Although this may lead to unnecessary flushes of TLBs 932 and 934, the present invention is a substantial improvement over prior systems that flush all TLBs in a system when even a single page table entry, anywhere in the system, is updated or invalidated.

The present invention can be implemented in software, firmware, hardware, or any combination thereof. In one embodiment, the present invention is implemented as an integral part of an operating system. In another embodiment, the present invention can be implemented as an application program that interfaces with an operating system.

Figure 15:
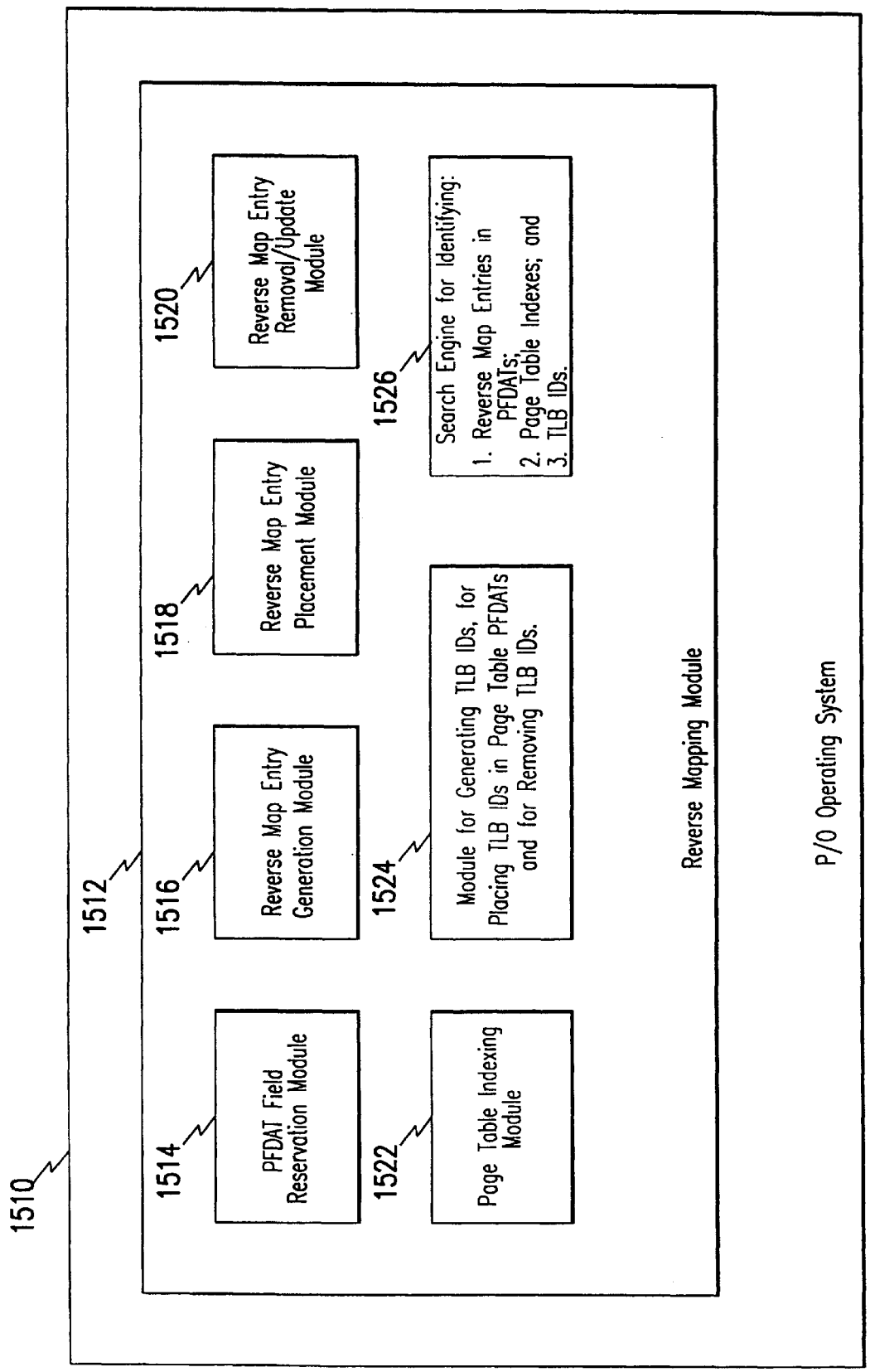
FIG. 15 is a block diagram of a system for reverse mapping memory to page tables, according to the present invention.

For example, referring to FIG. 15, the present invention can be implemented as a reverse mapping module 1512 which is an integral part of an operating system 1510. Reverse mapping module 1512 can include a variety of modules for performing various tasks related to the present invention. For example, a PFDAT field reservation module 1514 includes instructions for reserving PFDAT fields, such as PFDAT fields 40 and 42, for storing reverse map data. A reverse map generation module 1516 includes instructions for generating reverse map entries. A reverse map entry placement module 1518 includes instructions for placing reverse map entries that are generated by module 1516 in reserved fields of a PFDAT or in a reverse map table. A reverse map entry removal module 1520 includes instructions for removing reverse map entries from PFDATs and from reverse map tables.

A page table indexing module 1522 can be included as part of Option 1 for indexing page table entries to reverse map entries. A module 1524 can be included as part of Option 2 for generating TLB identifications and for placing TLB identifications in PFDATs that represent pages of memory that store page tables.

A search engine module 1526 can be included for identifying reverse map entries in PFDATs, for identifying indexes to reverse map entries in page table entries and for locating TLB identification data in PFDATs. Alternatively, these functions can be performed by one or more of the previously mentioned modules.

Figure 10:
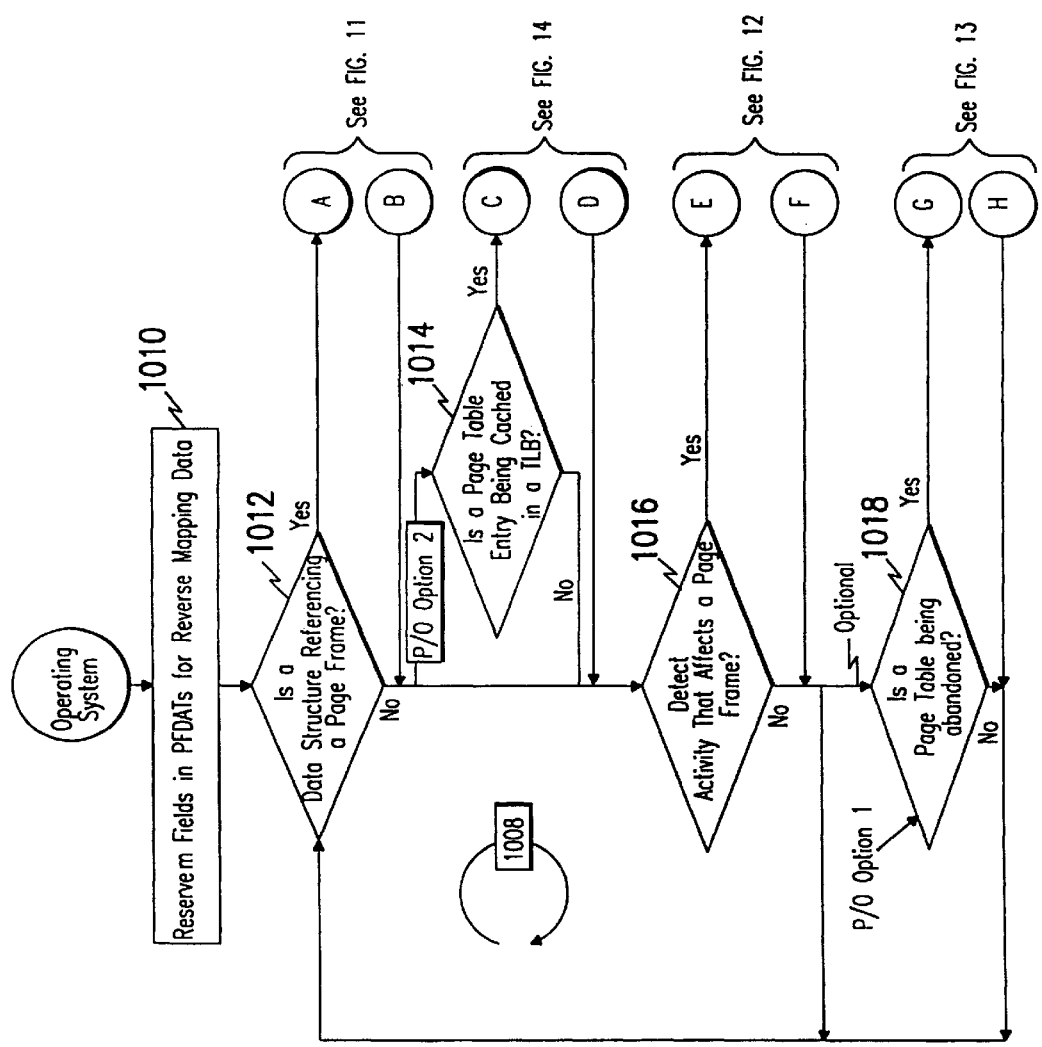
FIG. 10 is a high-level process flowchart illustrating a processing loop for generating and placing reverse map entries and for removing reverse map entries and illustrating optional processes for indexing page table entries to reverse map entries and for identifying copies page table entries that are stored in TLBs, according to the present invention.

Referring to FIG. 10, a high level process flowchart illustrates a preferred method for implementing the present invention, including Options 1 and 2. The method is described as implemented by operating system 1510 and reverse mapping module 1512 therein. The method can, however, be implemented through software other than an operating system, or through firmware, hardware or any combination thereof.

The process begins at step 1010 where module 1514 reserves a number m of fields in each page frame data structure that references a page of memory. For example, where m is two, two reverse mapping fields 410 and 412 are reserved in each page frame data structure 128. Step 1010 can be performed when PFDATs are allocated, which can be at boot-up.

Processing then proceeds to a loop 1008 which begins with step 1012. In step 1012, when a data structure references a page of memory, reverse map generation module 1516 is invoked. For example, when page table entry 818, which references $P_0$ (110), is first placed in page table 810, step 1012 is answered in the affirmative and processing proceeds to FIG. 11, where a reverse map entry is generated to identify the new reference. After the new reverse map entry is generated, module 1518 is invoked to place the reverse map entry in a PFDAT or in a reverse map table. Where Option 1 is implemented, page table indexing module 1522 is invoked to index the referencing page table entry to the newly generated reverse map entry. These processes are described more fully below, with reference to FIG. 11.

If step 1012 is answered in the negative, processing can proceed to step 1016. Alternatively, where Option 2 of the present invention is implemented, processing proceeds to step 1014 where reverse mapping module 1512 determines whether a reference is being cached in a TLB. If so, processing proceeds to FIG. 14, where module 1524 is invoked to generate TLB identification data and to place the data in a PFDAT that is associated with the page table. Otherwise, processing proceeds to step 1016. These processes are described more fully below.

In step 1016, reverse mapping module 1512 monitors for activity that affects a page frame, such as a data move or a data delete. If step 1016 is answered in the affirmative, processing proceeds to FIG. 12, where module 1520 is invoked so that a page frame data structure that represents the affected page frame can be checked for reverse map entries. The reverse map entries are used to identify and update or remove any references to the page frame, depending upon the type of activity detected. The process is described more fully below, with reference to FIG. 12.

If step 1016 is answered in the negative, processing of loop 1008 proceeds. In one embodiment of the present invention, processing of loop 1008 returns to step 1012. Alternatively, where Option 1 of the present invention is implemented, processing proceeds to step 1018 where reverse mapping module 1512 determines whether a page table is being abandoned. If so, processing proceeds to FIG. 13, where reverse map entries that point to page table entries in the page table are removed. Where option 1 is implemented, the process includes using page table entry indexes to identify reverse map entries that are stored in reverse map tables. If a page table is not being abandoned, processing of loop 1008 returns to step 1012. These processes are described more fully below.

Figure 11:
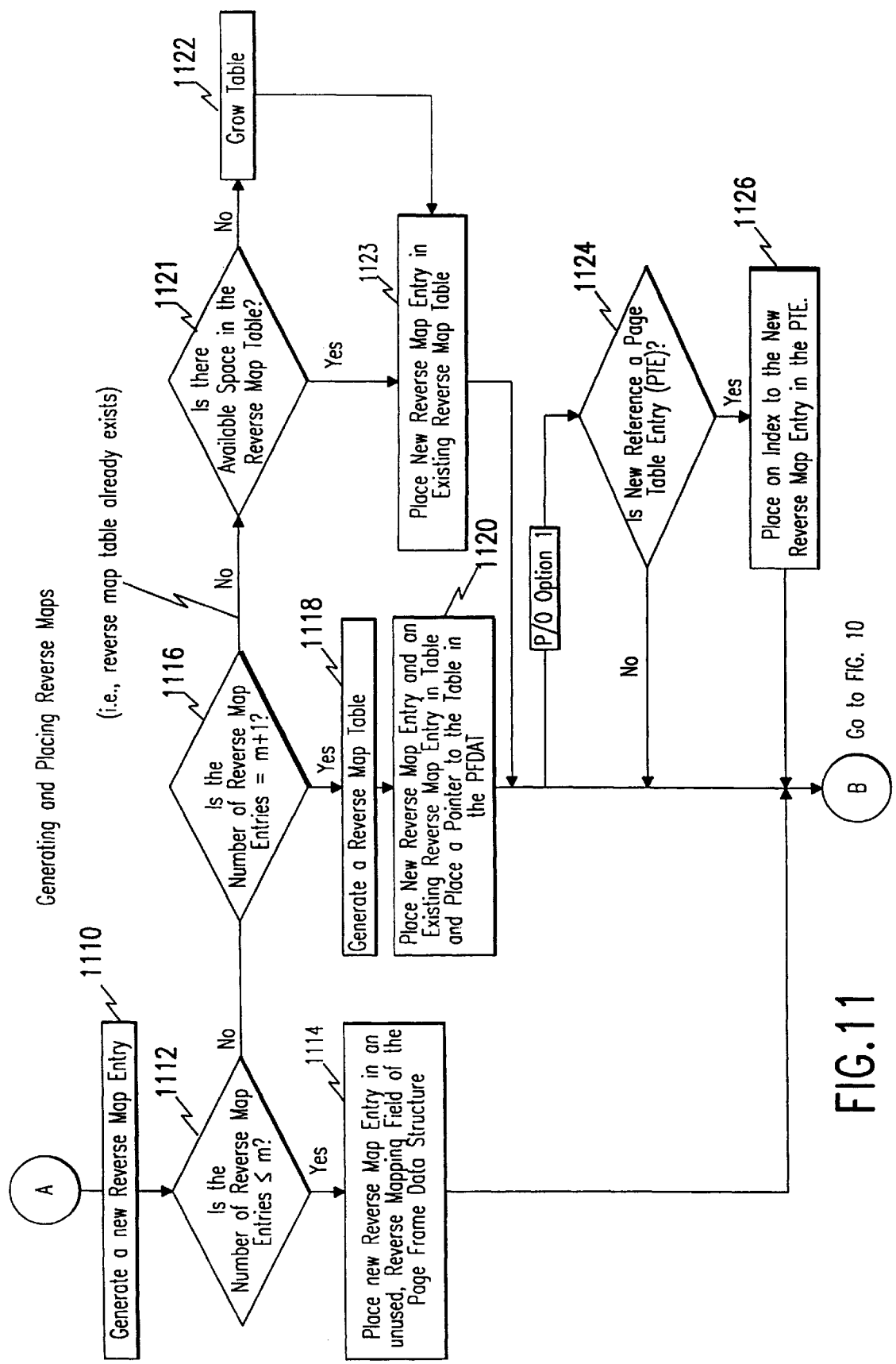
FIG. 11 is a process flowchart for generating reverse map entries, for placing reverse map entries in page frame data structures and in reverse map tables and for indexing page table entries to reverse map entries, according to the present invention.

Referring to FIG. 11, when reverse mapping module 1512 determines in step 1012 that a data structure, such as page table 316, is referencing a page frame, such as page frame $P_0$ (110), a new reverse map entry for pointing to the new reference must be generated and associated with the page frame. A preferred method for generating and placing reverse map entries begins at step 1110, where a new reverse map entry is generated by module 1516.

After the new reverse map entry is generated, it must be associated with page frame data structure 128. If there are any unused, reserved fields, such as fields 410 and 412, in page frame data structure 128, the new reverse map is entry placed directly into one of those fields. If there are not any available reserved fields in page frame data structure 128, the new reverse map entry is placed in a reverse map table. If a reverse map table already exists, the new reverse map entry can be placed directly therein. If a reverse map table does not currently exist, one must be generated and one of the reverse mapping fields 410 or 412 must be used to store a pointer to the new reverse map table.

Thus, after a new reverse map is generated in step 1110, processing proceeds to step 1112 where module 1518 is invoked to determine whether the number of reverse map entries, including the new reverse map entry, is less than or equal to m. If the number of reverse maps is less than or equal to m, then there are sufficient available reserved fields, such as 410 and 412, in page frame data structure 128 for storing the new reverse map entry. Processing proceeds to step 1114, where the new reverse map entry is placed in an unused, reserved reverse mapping field such as reverse mapping field 410 or 412.

Since the reverse map entry is not being placed in a reverse map table, the index field that corresponds to the page table entry, such as, for example, index field 840 of page table entry 818, does not need an index to the reverse map entry. Thus, processing proceeds to step 1014 if option 2 is implemented, or to step 1016.

If, in step 1112, the number of reverse map entries is not less than or equal to m, processing proceeds to step 1116, where module 1518 determines whether the number of reverse map entries, including the new reverse map entries, is equal to m+1. As described in steps 1218–1222 below, reverse map tables are preferably deleted when the number of reverse map entries falls below m+1. In step 1116, if the number of reverse map entries now equals m+1, the number of reverse map entries now exceeds the number of available reserved fields in page frame data structure 128 and a reverse map table must be generated.

Processing proceeds to step 1118 where a reverse map table is generated, such as reverse map table 864. Reverse map table 864 can be generated by module 1518. Processing then proceeds to step 1120, where the new reverse map entry, such as reverse map 874, is placed in reverse map table 864 by module 1518. In addition, an existing reverse map entry, such as reverse map entry 876, that was stored in page frame data structure 134 is moved to reverse map table 864 so that a pointer, such as pointer 872, can be placed in page frame data structure 134 for pointing to new reverse map table 864.

Referring back to step 1116, if the number of reverse map entries is not equal to m+1, it already having been determined that the number of reverse map entries is not less than or equal to m, the number of reverse map entries m must be greater than m+1. If the number of reverse map entries is greater than m+1, a reverse map table must already exist.

In step 1121, reverse map generation module 1516 determines whether there is available space in the reverse map table for storing the new reverse map entry. If not, processing proceeds to step 1122 where reverse map generation module 1516 dynamically grows the reverse map table to accommodate the new reverse map entry. Step 1122 can be performed by allocating more memory to the existing reverse map table data structure or by generating an entirely new table and copying the reverse map entries from the old table. Preferably, step 1122 provides a number of additional spaces for storing reverse map entries so that step 1122 does not have to be performed too frequently. When there is sufficient space in the reverse map table for the new reverse map entry, processing proceeds to step 1123 where the new reverse map entry is placed in the reverse map table.

After the newly generated reverse map entry is placed by either of steps 1120 or 1123, if option 1 of the present invention is implemented, processing proceeds to step 1124 for indexing a page table entry to the new reverse map entry. Otherwise, processing proceeds to step 1014 if option 2 is implemented, or to step 1016.

In step 1124, page table indexing module 1522 determines whether the new reference is a page table entry reference. If the new reference is a page table entry reference, since the reverse map entry was placed in a reverse map table, processing proceeds to step 1126, where an index to the new reverse map entry is placed in an indexing field of the page table entry.

For example, when page table entry 880 references $P_3$ (116), reverse map entry 874 is placed in reverse map table 864 (step 1120 or 1122), an index to reverse map entry 874 is placed in index field 888 in step 1126. Processing then proceeds to step 1016 or, where Option 2 is implemented to step 1014.

In step 1014, reverse mapping module 1512 determines whether a page table entry is being cached in a TLB. If a reference is being cached in a TLB, processing proceeds to FIG. 14, where module 1524 is invoked to generate data to identify the TLB and associate the TLB identification data with the page table.

Figure 14:
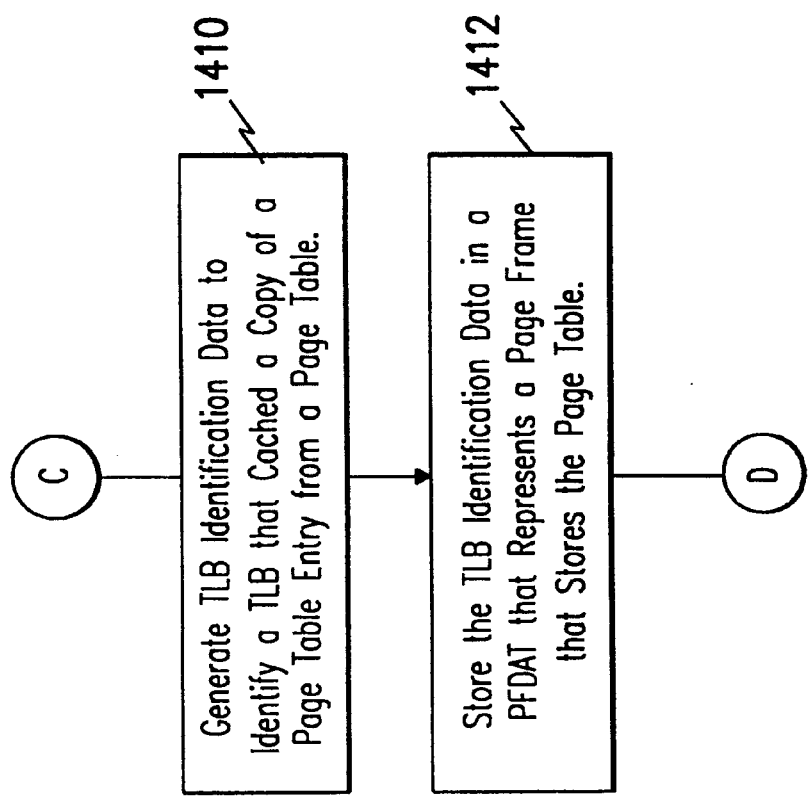
FIG. 14 is a process flowchart for storing data that identifies a TLB that stores a copy of a page table entry, according to the present invention.

Referring to FIG. 14, processing begins at step 1410 where module 1524 generates data for identifying a TLB. For example, when any of page table entries 818–826 is placed in TLB 932, TLB ID 924 is generated for identifying TLB 932.

In step 1412, the TLB data is associated with the page table, preferably by placing the TLB data in a page frame data structure that represents the page frame that stores the page table. In the example above, where a page table entry is copied from page table 810, TLB ID 924 is placed in page frame data structure 912, that represents page table 810. Processing then proceeds to step 1016 in FIG. 10.

In step 1016, when reverse mapping module 1512 detects activity that affects a page frame, any data structures that reference the page frame must be updated if the data in the page frame is moved, or deleted if the data in the page frame is deleted. A preferred method for identifying and updating referencing data structures is provided in FIG. 12.

Figure 12:
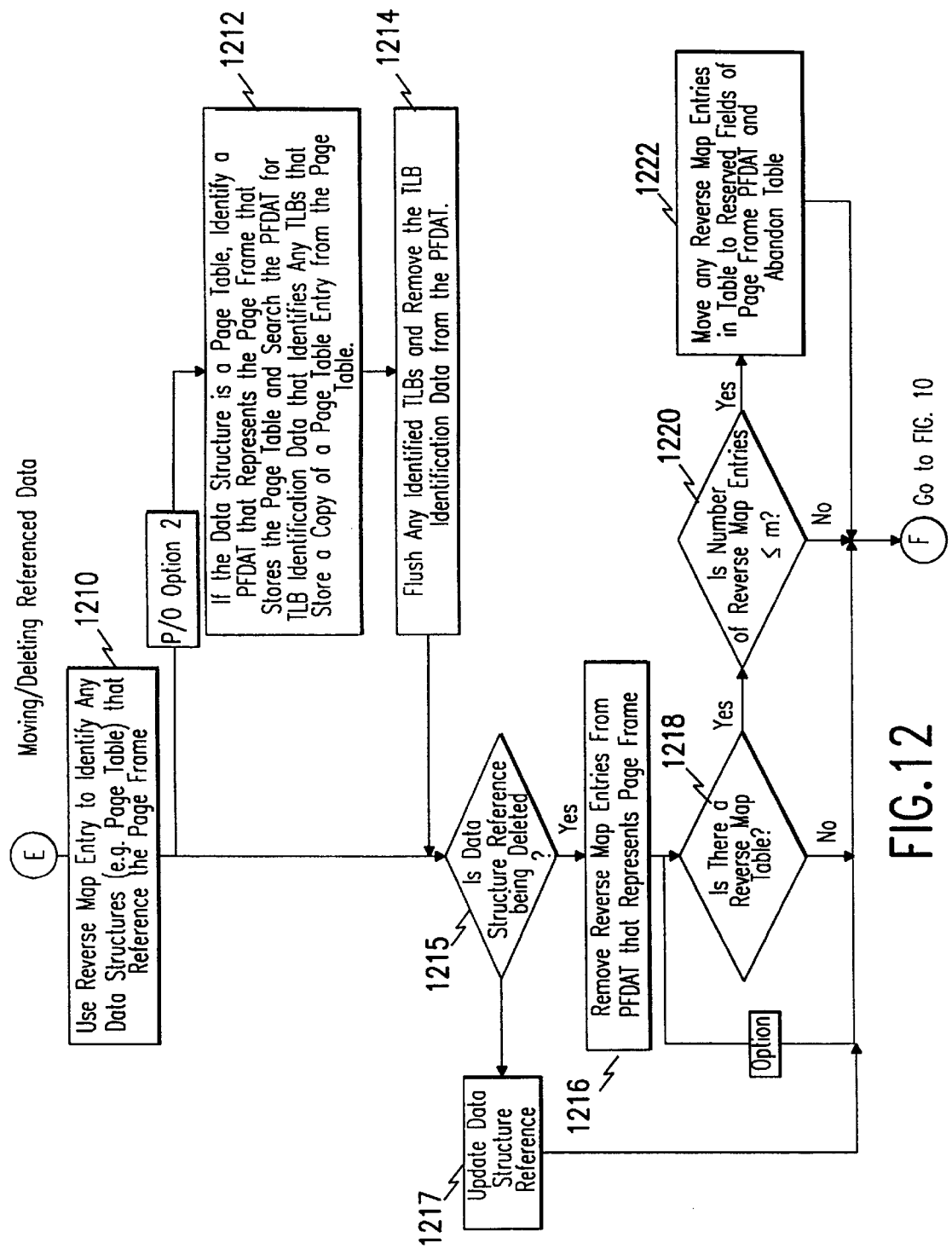
FIG. 12 is a process flowchart for removing reverse map entries when mapped data is moved or deleted, according to the present invention.

Referring to FIG. 12, the process begins at step 1210 where a page frame data structure, such as page frame data structure 128, that is associated with the page frame, such as page frame 110, that contains the data that is affected, is searched for reverse map entries. The search can be performed by search engine 1526. Search engine 1526 searches page frame data structure fields 410 and 412 for reverse map entries and for a pointer to a reverse map table. If one or more reverse map entries are found in the page frame data structure or in an associated reverse map table, search engine 1526 uses the reverse map entry or entries to identify data structures that reference the page frame.

Figure 7:
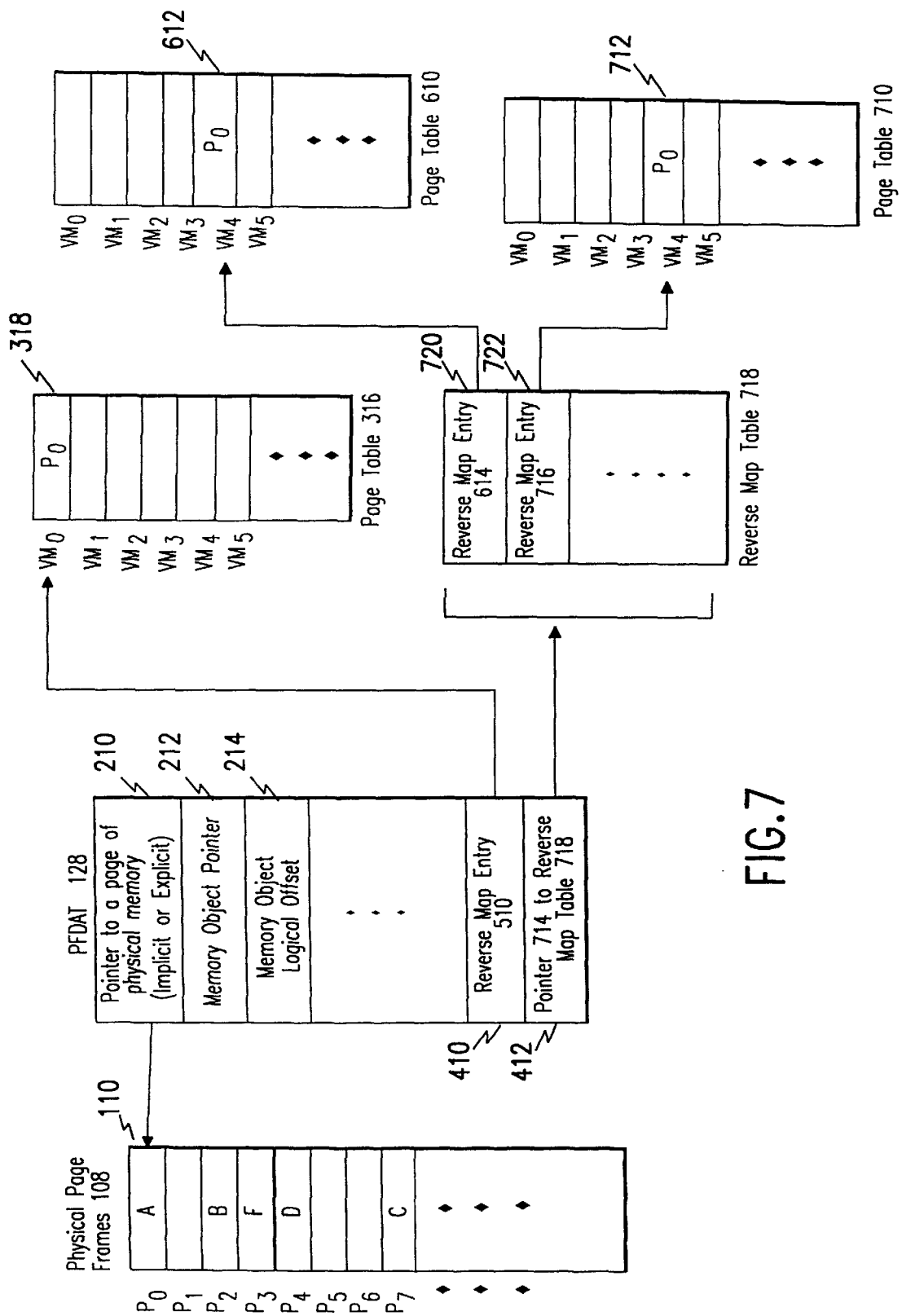
FIG. 7 is a block diagram illustrating the page frame data structure of FIG. 4, wherein one of the two reverse map fields stores a reverse map entry that points to a referencing page table entry and the other reverse map field stores a pointer to a reverse map table that can store a plurality of additional reverse map entries, according to the present invention.

For example, in FIG. 7, page frame data structure 128 includes reverse map entry 510 that points to page table entry 318. Pointer 714 identifies reverse map table 718 that includes additional reverse map entries 614 and 716. Reverse map entry 614 identifies page table entry 612 and reverse map entry 716 identifies page table entry 712. Thus, page table entries 318, 612, and 712 each include a reference to physical page frame 110. When data A in page frame 110 is moved to a different page frame or deleted, a search of PFDAT 128 identifies page table entries 318, 612, and 712 as referencing $P_0$ (110).

Where Option 2 of the present invention is implemented, and where the referencing data structure is a page table, processing proceeds to step 1212. In step 1212, search engine 1526 identifies a PFDAT that represents the page frame that stores the page table, such as, for example, page frame data structure 910 that is associated with page table 810. Search engine 1526 searches the PFDAT for any TLB identification data that identifies one or more TLBs that may store a copy of any page table entry from the page table. For example, search engine 1526 searches PFDAT 910 for TLB identifications such as TLB ID 924. TLB ID 924 identifies TLB 932 as potentially storing a copy of a page table entry from page table 810.

In step 1214, any TLBs that are identified in step 1212 are flushed and the TLB identification data is removed from the PFDAT identified in step 1212. Using the example above, TLB 932 is flushed and TLB ID 924 is removed from data structure 910. Steps 1212 and 1214 can be performed independent of reverse maps.

In step 1215, reverse mapping module 1512 directs processing to step 1216 if page table entry is being deleted or to step 1217 if a page table entry is being updated. In step 1217, the page table entry is updated by operating system 1510. The reverse map entry or entries that point to the page table entry are left unchanged.

In step 1216, if a page table entry is being deleted module 1520 removes reverse map entries that point to the page table entry, from the page frame data structure that represents the page frame. For example, in FIG. 7, reverse maps 510, 614, and 716 are deleted.

In one embodiment, after a reverse map entry is deleted, module 1520 determines whether reverse map entries that are associated with the page frame data structure can be consolidated from a reverse map table, such as reverse map table 718, into the reserved fields of the page frame data structure, such as fields 410 and 412 of page frame data structure 128. The process is illustrated in steps 1218–1222. Alternatively, processing can proceed to step 1012 in FIG. 10, or where Option 1 is implemented, to step 1018.

In step 1218, module 1520 determines whether there is a reverse map table. If there is no reverse map table, there is no need to consolidate reverse map entries from a page table to a page frame data structure and processing proceeds to step 1012 or, where Option 1 is implemented, to step 1018.

If there is a reverse map table, processing proceeds from step 1218 to step 1220, where module 1520 determines whether the number of reverse map entries is less than or equal to the number of reserved fields m. If the number of reserved fields is not less or equal to m, that is, if the number of reverse map entries is greater than the number of reserved fields, there is no need to consolidate reverse map entries from a reverse map table to a page frame data structure and processing proceeds to step 1012 or, where option 1 is implemented, to step 1018.

If the number of reverse maps is less than or equal to m, processing proceeds to step 1222 for consolidation of reverse map entries. In step 1222, module 1520 moves any reverse map entries that are in the reverse map table, such as table 718, to the reserved fields of the page frame data structure, such as reserved fields 410 and 412. After the reverse map entries are moved, the reverse map table is deleted or removed. Where option 1 is implemented, the index field of any page table entries that are indexed to the de-allocated reverse map table are voided. Processing then proceeds to step 1012 or, where Option 1 is implemented, to step 1018.

Figure 13:
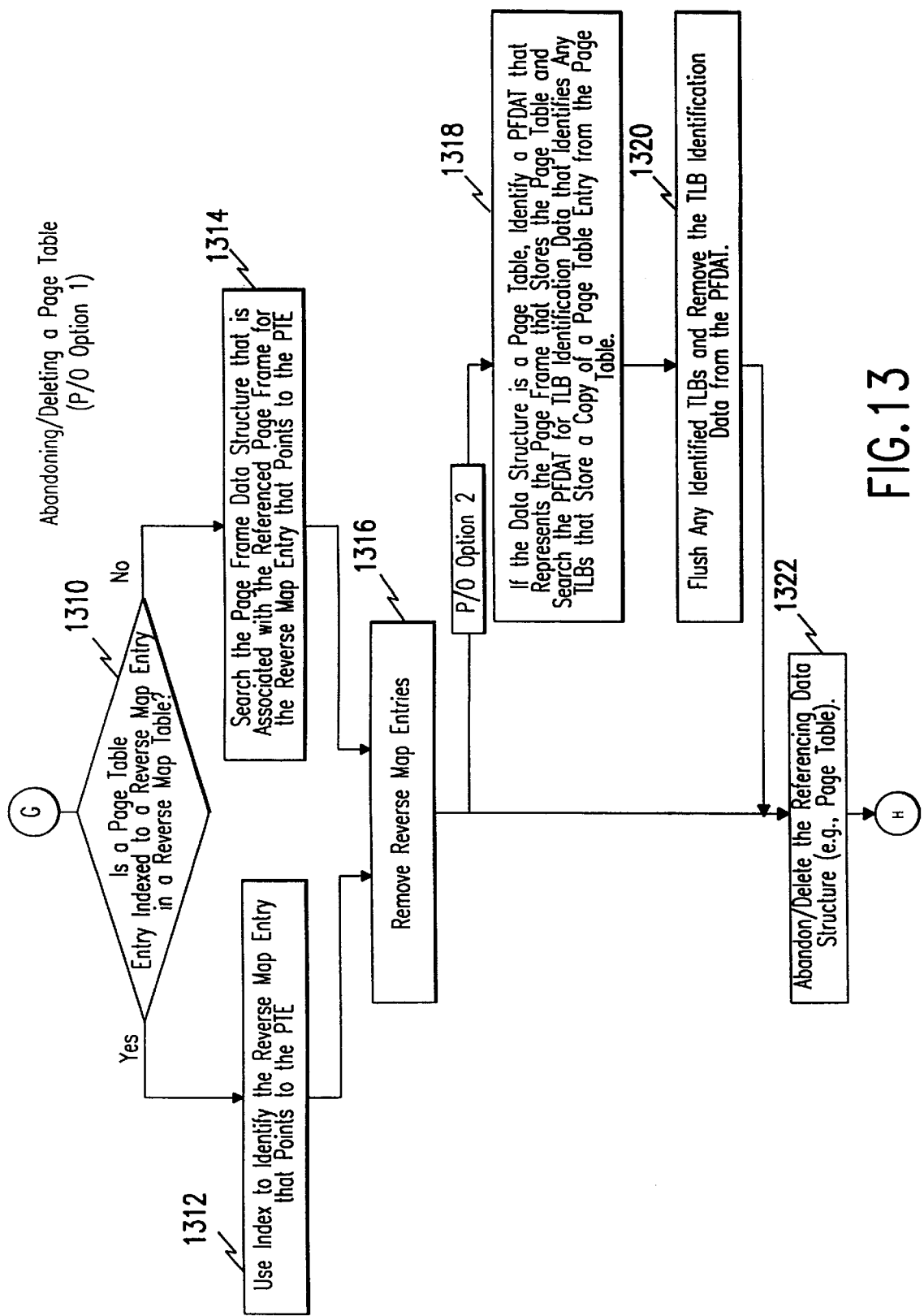
FIG. 13 is a process flowchart for removing reverse map entries and for flushing TLBs that store a page table entry when a page table is abandoned or deleted, according to the present invention.

In step 1018, when a page table is being abandoned, any reverse map entries that point to the page table must be deleted. A preferred method for identifying and removing reverse map entries is illustrated in FIG. 13.

Processing begins at step 1310, where search engine 1526 accesses each page table entry in the page table that is to be deleted. Search engine 1526 looks to the index field of each page table entry to determine whether the page table entry is indexed to a reverse map entry that is stored in a revere map table. For example, in FIG. 8, if page table 810 is being deleted, page table entry index fields 840–846 and 850 are checked for indexes to reverse map entries. Similarly, if page table 814 is to be deleted, index field 888 is checked for an index to a reverse map entry.

If an index field stores an index to a reverse map entry that is stored in a reverse map table, processing proceeds to step 1312, where search engine 1526 uses the page table entry index to identify the reverse map entry in a reverse map table that points to the page table entry. If an index field does not store an index, processing proceeds to step 1314, where search engine 1526 searches the page frame data structure that is associated with the referenced page frame for the reverse map entry that points to the page table entry.

In step 1316, reverse map entries that are identified in steps 1312 and 1314 are deleted by module 1520. Reverse map entries can be consolidated as described with reference to steps 1218–1222.

Where Option 2 of the present invention is implemented, processing proceeds to step 1318, for flushing of TLBs that may store a copy of any of the page table entries from the page table. In step 1318, search engine 1526 identifies a PFDAT that represents the page frame that stores the page table. Search engine 1526 searches the PFDAT for any TLB identification data that identifies one or more TLBs that store a copy of any page table entry from the page table.

In step 1320, the operating system flushes any TLBs identified in step 1318. Module 1524 removes the TLB IDs from the page frame data structure that was identified in step 1318. Processing then proceeds to step 1322 where the page table is abandoned or deleted. Processing then returns to step 1012.

As would be apparent to one skilled in the art, the present invention can be employed in a variety of operations where a page is affected. For example, the present invention can be used to identify references to a page of memory that is affected by a page-migration operation, a file truncation operation, a virtual cache coherency operation, a fork operation, a page aging operation, a page out operation, and any other operation that affects the page of memory.

In addition, the present invention can be implemented as part of an inter-cell page sharing system, method and computer program product as disclosed in co-pending U.S. Application titled, "System, Method and Computer Program Product for Inter-Cell Page Sharing in a Distributed Shared Memory System," by Curt F. Schimmel, filed concurrently herewith, Attorney Docket No. 15-4-464.00 (1452.2340000), incorporated herein by reference, in its entirety. In an inter-cell page sharing implementation, reverse maps are used to, among other things, identify data structure references, such as page table entries, that reference an imported page of memory. When the import is terminated, reverse maps associated with the imported page of memory are used to identify and remove references to the page.

6. Conclusions

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for reverse mapping page frame data structures that represent pages of memory, comprising the steps of:

(1) reserving a number m of fields in a first page frame data structure for storing reverse mapping information, the first page frame data structure representing a first page of memory;

(2) generating a number n of reverse map entries for pointing to data structure references that reference the first page of memory, wherein n≧2;

(3) if the number n is less than or equal to the number m, placing all of the reverse map entries in the reserved fields of the first page frame data structure, (4) if the number n is greater than the number m,
  (i) placing m−1 reverse map entries in m−1 corresponding reserved fields,
  (ii) placing the remaining n−(m−1) reverse map entries in a reverse map table, and
  (iii) placing a pointer to the reverse map table in an unused reserved field of the first page frame data structure; and (5) storing an index in each of the data structure references, wherein the index identifies one of the n reverse map entries that is pointing to the data structure reference.

2. The method according to claim 1, further comprising the steps of:
  (6) detecting that data that is stored in the first page of memory is being moved to a second page of memory,
  (7) using the reverse maps to identify the data structure references that reference the first page of memory, and
  (8) updating the data structure references so that they reference the second page of physical memory.

3. The method according to claim 1, wherein step (2) comprises the steps of:
  (a) generating a first reverse map entry that points to a page table entry that references the first page of memory.

4. The method of claim 3, further comprising the steps of:
  (6) using the first reverse map entry to identify the page table entry in a distributed, shared memory multiprocessor system, wherein the first page of memory is located in a first processing node and data that is stored in the first page of memory is migrated to a second page of memory that is located in a second processing node;
  (7) updating the page table entry so that it references the second page of memory instead of the first page of memory;
  (8) placing a second reverse map entry in a second page frame data structure that represents the second page of memory, wherein the second reverse map entry points to the first page table entry; and
  (9) removing the first reverse map entry from the first page frame data structure.

5. The method of claim 3, further comprising the steps of:
  (6) when a portion of a file that is mapped to the first page of memory is truncated, using the first reverse map entry to identify the first page table entry;
  (7) removing the page table entry that is associated with the first page table address; and
  (8) removing the first reverse map entry from the first page frame data structure.

6. The method according to claim 3, further comprising the steps of:
  (6) when a copy of the page table entry is placed in a translational look-aside buffer (TLB), placing data that identifies the TLB in a page frame data structure that represents a page frame that stores the page table; and
  (7) using the data that identifies the TLB to flush the TLB when a page table entry in the page table is changed.

7. The method of claim 1, further comprising the steps of:
  (6) when a page of data is mapped to more than one virtual address by page table entries in different page tables, identifying a page frame data structure that is referenced by the more than one virtual addresses;
  (7) using reverse map entries in the page frame data structure to identify the page table entries that map the data to the more than one virtual addresses; and
  (8) deallocating all but one of the page table entries that map the data to the more than one virtual addresses.

8. The method according to claim 1, further comprising the steps of:
  (6) when a data structure reference is discarded, using the index stored in the data structure reference to identify the one of the n reverse map entries pointing at the data structure reference; and
  (7) removing the identified one of the n reverse map entries.

9. The method of claim 1, further comprising the steps of:
  (6) detecting activity that affects the first page of memory; and
  (7) using the n reverse map entries to identify the data structure references.

10. The method according to claim 9, wherein step (6) comprises:
  (a) detecting at least one of the following types of activities that affects the first page of memory;
    (i) a move operation,
    (ii) a delete operation,
    (iii) a virtual cache coherency operation,
    (iv) a fork operation,
    (v) a page-migration operation,
    (vi) a file truncation operation,
    (vii) a page aging operation, and
    (viii) a page out operation.

11. The method according to claim 9, wherein step (6) comprises:
  (a) detecting a termination of an import operation that affects the first page of memory.

12. A method for reverse mapping page frame data structures that represent pages of memory, comprising the steps of:
  (1) reserving a number m of fields of a page frame data structure that represents a page frame for storing reverse mapping information;
  (2) generating a plurality of reverse map entries that point to corresponding data structures that reference the page frame;
  (3) associating each of the plurality of reverse map entries with the page frame data structure, comprising the steps of:
    (a) generating a dynamically sizeable reverse map table;
    (b) placing at least one of the plurality of reverse map entries in the reverse map table; and
    (c) placing a pointer to the reverse map table in one of the reserved fields of the page frame data structure; and
  (4) storing an index that identifies one of the plurality of reverse map entries in the corresponding data structure.

13. The method according to claim 12, wherein step (3) comprises the steps of:
  (a) placing the reverse map entry in one of the reserved fields of the page frame data structure.

14. A computer program product comprising a computer useable medium having computer program logic stored therein, said computer program logic for enabling a computer to reverse map a page frame to data structure references that reference the page frame, wherein said computer program logic comprises:

a procedure that enables the computer to employ a number m of fields of a first page frame data structure, that represents a first page of memory, for storing reverse mapping information;

a procedure that enables the computer to generate a number n of reverse map entries for pointing to data structure references that reference the first page of memory, wherein n≧2;

a procedure that enables the computer to place the reverse map entries in the reserved fields of the first page frame data structure if the number n is less than or equal to the number m;

a procedure that enables the computer to place m−1 reverse map entries in m−1 of the reserved fields if the number n is greater than the number m;

a procedure that enables the computer to place n−(m−1) reverse map entries in a reverse map table if the number n is greater than the number m;

a procedure that enables the computer to place a pointer to the reverse map table in an unused one of the m fields of the first page frame data structure if the number n is greater than the number m;

a procedure that enables the computer to store an index in each of the data structure references, wherein the index identifies one of the n reverse map entries that is pointing to the data structure reference.

15. The computer program product of claim 14, wherein said computer program logic further comprises:

a procedure that enables the computer to use a first reverse map entry to identify a first page table entry that references the first page of memory;

a procedure that enables the computer to update the first page table entry with a reference to a second page of memory if data that is mapped to the first page of memory is moved to the second page of memory;

a procedure that enables the computer to generate a second reverse map entry in a second page frame data structure that represents a second page of memory, if data that is mapped to the first page of memory is moved to the second page of memory; and a procedure that enables the computer to remove the first reverse map entry from the first page frame data structure.

16. The computer program product of claim 14, further comprising:

a procedure that enables the computer to place data that identifies a translational look-aside buffer (TLB) in a page frame data structure that represents a page frame that stores the page table, when a copy of a page table entry from the page table is placed in the (TLB); and a procedure that enables the computer to use the data that identifies the TLB to flush the TLB when a page table entry in the page table is changed.

17. A system for reverse mapping a page frame to a data structure reference that references the page frame, comprising:

a procedure that employs a number m of fields of a first page frame data structure, that represents a first page frame, for storing reverse mapping information;

a procedure that generates a number n of reverse map entries for pointing to data structure references that reference the first page frame, wherein n≧2;

a procedure that places the reverse map entries in the reserved fields of the first page frame data structure if the number n is less than or equal to the number m;

a procedure that places m−1 reverse map entries in m−1 in the reserved fields of the first page frame data structure if the number n is greater than the number m;

a procedure the places n−(m−1) reverse map entries in a reverse map table if the number n is greater than the number m;

a procedure that places a pointer to the reverse map table in a remaining field of the first page frame data structure if the number n is greater than the number m; and a procedure that stores an index in each of the data structure references, wherein the index identifies one of the n reverse map entries that is pointing to the data structure reference.

18. The system according to claim 17, wherein said procedure that employs a number m of fields of a first page frame data structure, comprises a procedure that employs two fields of the first page frame data structure for storing reverse mapping information.

19. The system according to claim 17, further comprising:

a procedure that uses a first reverse map entry to identify a first page table entry that references the first page of memory;

a procedure that updates the first page table entry with a reference to a second page of memory if data that is mapped to the first page of memory is moved to the second page of memory; and a procedure that generates a second reverse map entry in a second page frame data structure that represents a second page of memory, if data that is mapped to the first page of memory is moved to the second page of memory.

20. The system of claim 17, further comprising:

a procedure that reverse maps a page frame to a page table entry that references the page frame;

a procedure that places data that identifies a translational look-aside buffer (TLB) in a page frame data structure that represents a page frame that stores the page table, when a copy of a page table entry from the page table is placed in the (TLB); and a procedure that uses the data that identifies the TLB to flush the TLB when a page table entry in the page table is changed.

* * * * *